(12) United States Patent
Grimaldo et al.

(10) Patent No.: US 10,647,185 B2
(45) Date of Patent: May 12, 2020

(54) DRIVE LINK APPARATUS FOR USE WITH VEHICLE SUNROOFS

(71) Applicant: AISIN TECHNICAL CENTER OF AMERICA, INC., Northville, MI (US)

(72) Inventors: Jacob Grimaldo, Northville, MI (US); Shintaro Katsura, Novi, MI (US); Michael Mixon, Brighton, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 16/358,941

(22) Filed: Mar. 20, 2019

(65) Prior Publication Data
US 2020/0114742 A1    Apr. 16, 2020

Related U.S. Application Data

(63) Continuation-in-part of application No. 16/157,823, filed on Oct. 11, 2018.

(51) Int. Cl.
| | | |
|---|---|---|
| *B60J 7/043* | (2006.01) | |
| *B60J 7/057* | (2006.01) | |
| *B60J 7/05* | (2006.01) | |

(52) U.S. Cl.
CPC .............. *B60J 7/043* (2013.01); *B60J 7/05* (2013.01); *B60J 7/057* (2013.01)

(58) Field of Classification Search
CPC . B60J 7/043; B60J 7/057; B60J 7/0573; B60J 7/05
USPC ........................ 296/216.02–216.05, 223, 224
See application file for complete search history.

(56) References Cited

U.S. PATENT DOCUMENTS

| | | |
|---|---|---|
| 2,087,670 A | 7/1937 | King |
| 4,245,864 A | 1/1981 | Shitanoki |
| 4,403,805 A | 9/1983 | Strem, Jr. et al. |
| 4,652,045 A | 3/1987 | Hanley et al. |
| 5,718,472 A | 2/1998 | Otake et al. |
| 6,290,289 B1 | 9/2001 | Ohtsu et al. |
| 6,857,694 B2 | 2/2005 | Radmanic |
| 6,877,799 B2 | 4/2005 | Seifert et al. |
| 7,025,414 B2 | 4/2006 | Hanke |
| 7,125,070 B2 | 10/2006 | Sawada et al. |
| 7,246,848 B2 | 7/2007 | Kawamura et al. |

(Continued)

FOREIGN PATENT DOCUMENTS

| | | |
|---|---|---|
| CN | 206623663 U | 11/2017 |
| DE | 10 2016 201 578 A1 | 8/2017 |

(Continued)

*Primary Examiner* — Dennis H Pedder
(74) *Attorney, Agent, or Firm* — Oblon, McClelland, Maier & Neustadt, L.L.P.

(57) ABSTRACT

Drive link apparatus for use with vehicle sunroofs are disclosed herein. An example assembly for a vehicle sunroof includes a drive shoe. The drive shoe is movable along a rail and includes a ramp portion positioned thereon. The assembly also includes a drive link that is rotatably coupled to the drive shoe and supports a panel. The drive link includes a guide portion that is positioned thereon and configured to slidably engage the ramp portion to prevent the drive link from rotating during a sunroof operation. The guide portion includes an extension that is positioned thereon and interposed between the drive shoe and a guide block. The extension is configured to slidably engage the drive shoe, the ramp portion, or the guide block to prevent the drive link from twisting during the sunroof operation.

16 Claims, 23 Drawing Sheets

(56) References Cited

U.S. PATENT DOCUMENTS

| | | |
|---|---|---|
| 7,810,879 B2 | 10/2010 | Nakamura |
| 7,878,581 B2 | 2/2011 | Faerber et al. |
| 8,052,207 B2 | 11/2011 | Horiuchi et al. |
| 8,857,903 B2 | 10/2014 | Nellen et al. |
| 8,876,201 B2 | 11/2014 | Katsura |
| 9,290,085 B2 | 3/2016 | Sawada et al. |
| 9,592,723 B2 | 3/2017 | Ohdoi et al. |
| 2012/0112498 A1 | 5/2012 | Kikuchi et al. |
| 2018/0072143 A1 | 3/2018 | Sommer et al. |

FOREIGN PATENT DOCUMENTS

| | | |
|---|---|---|
| EP | 0 955 195 A1 | 11/1999 |
| EP | 2 263 896 A1 | 12/2010 |
| FR | 2 555 518 A1 | 5/1985 |
| JP | 2017-128150 A | 7/2017 |

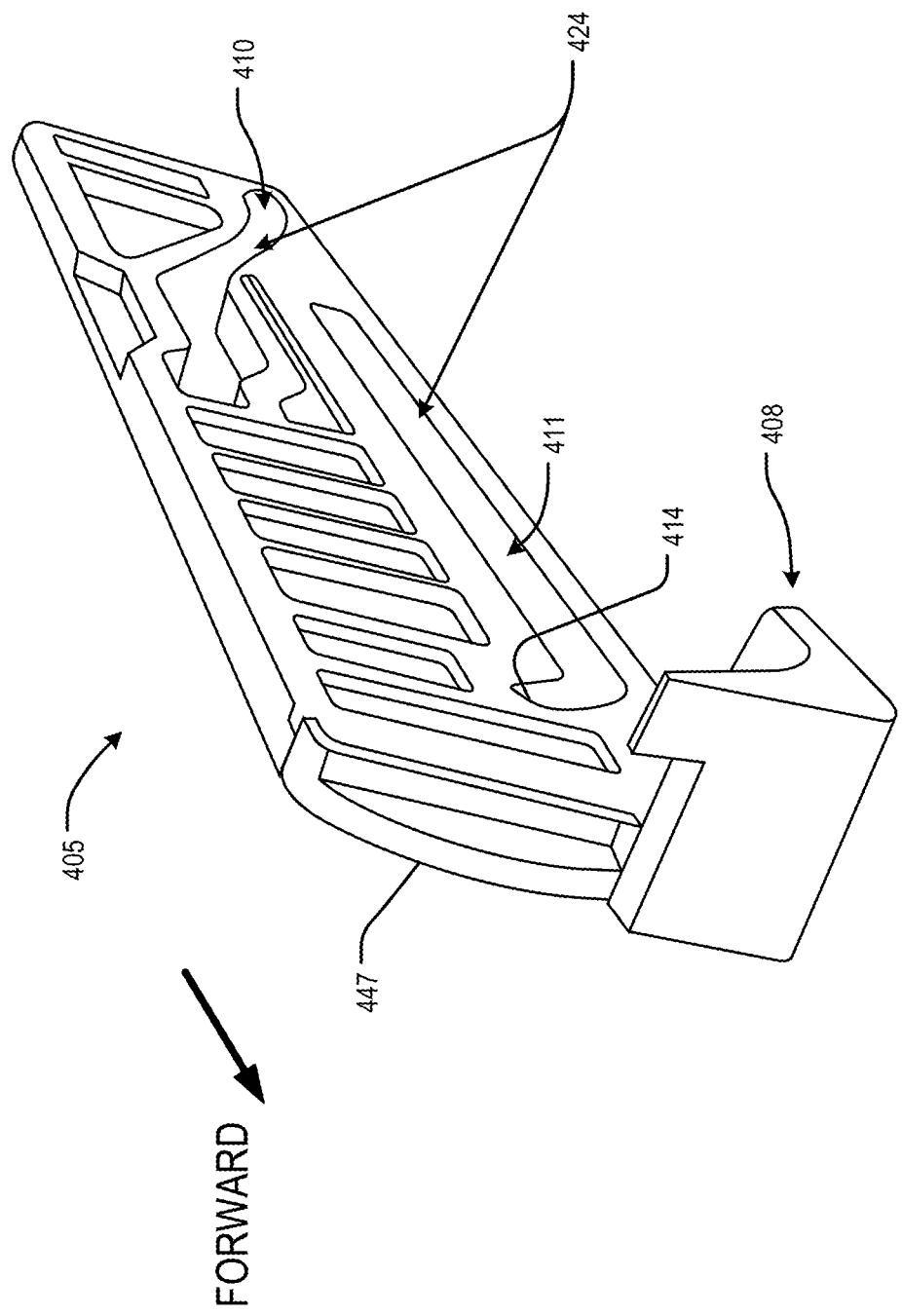

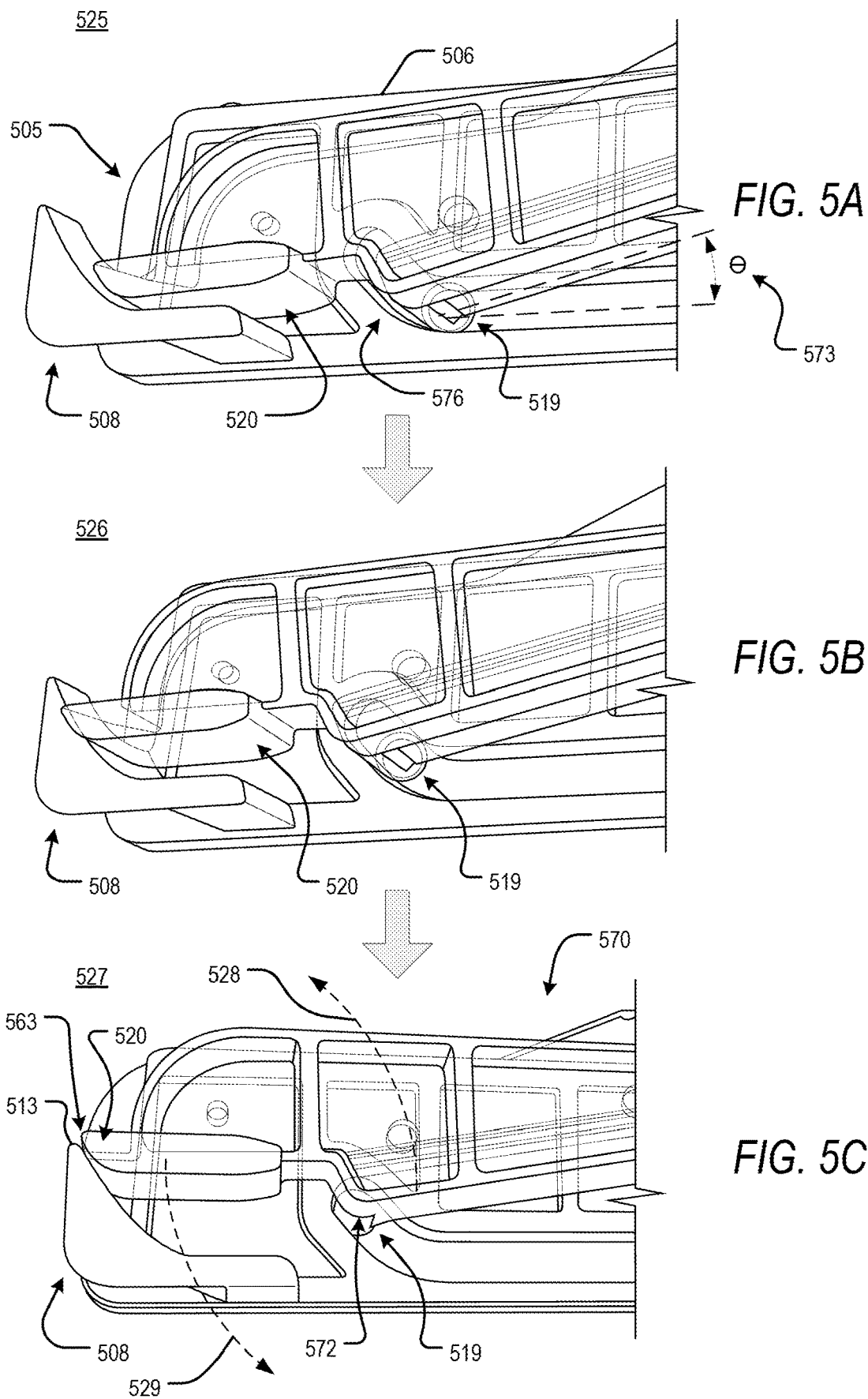

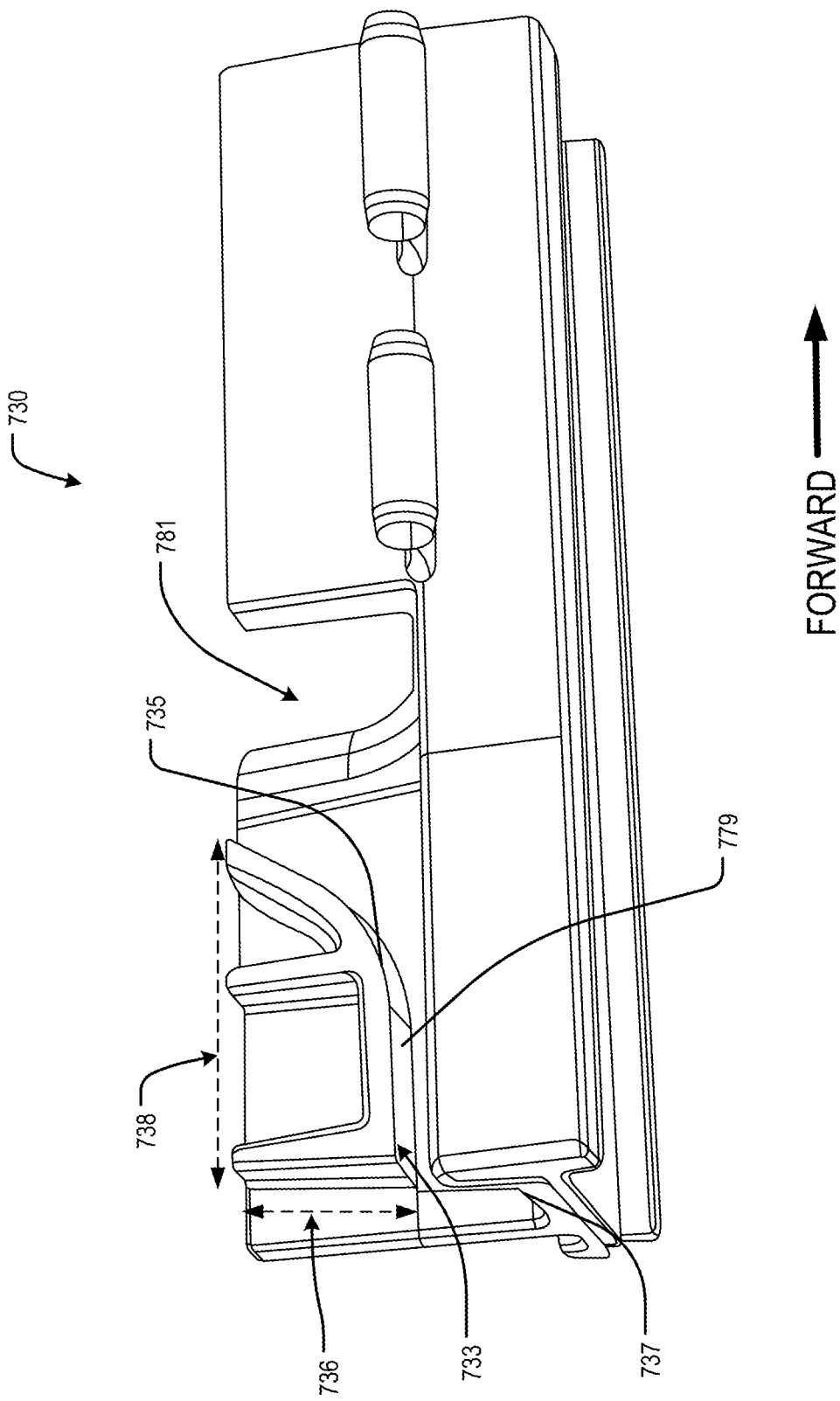

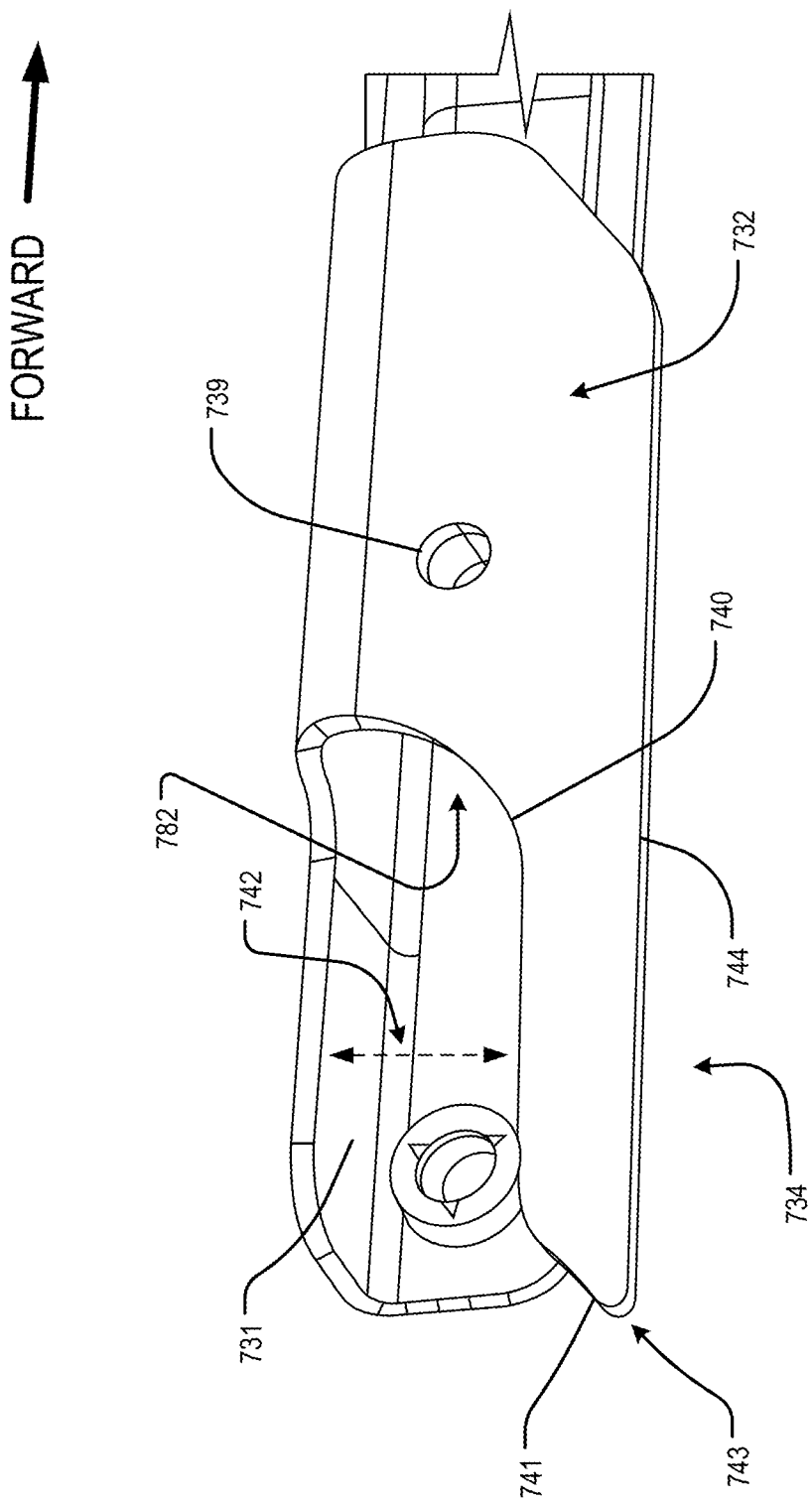

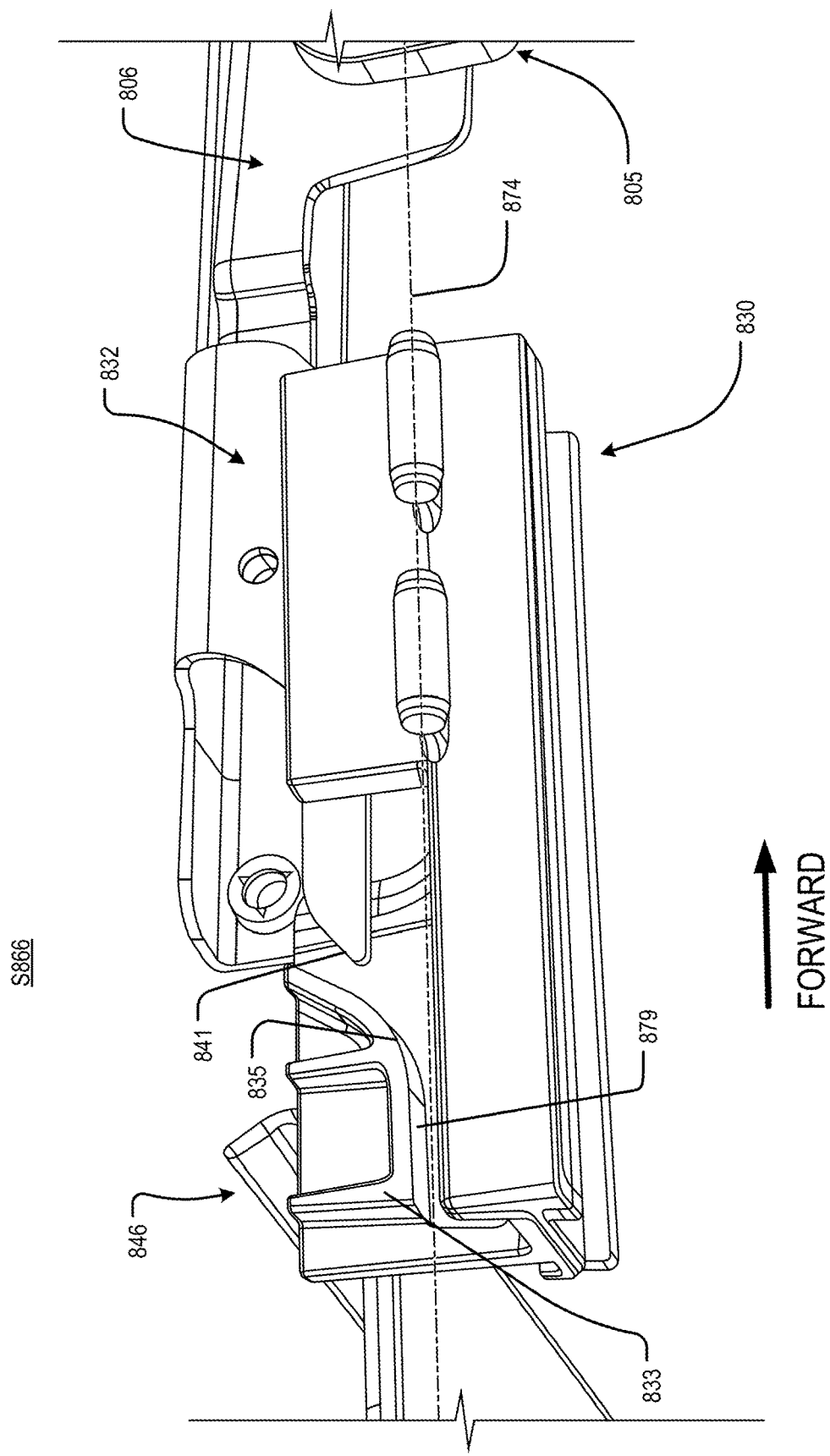

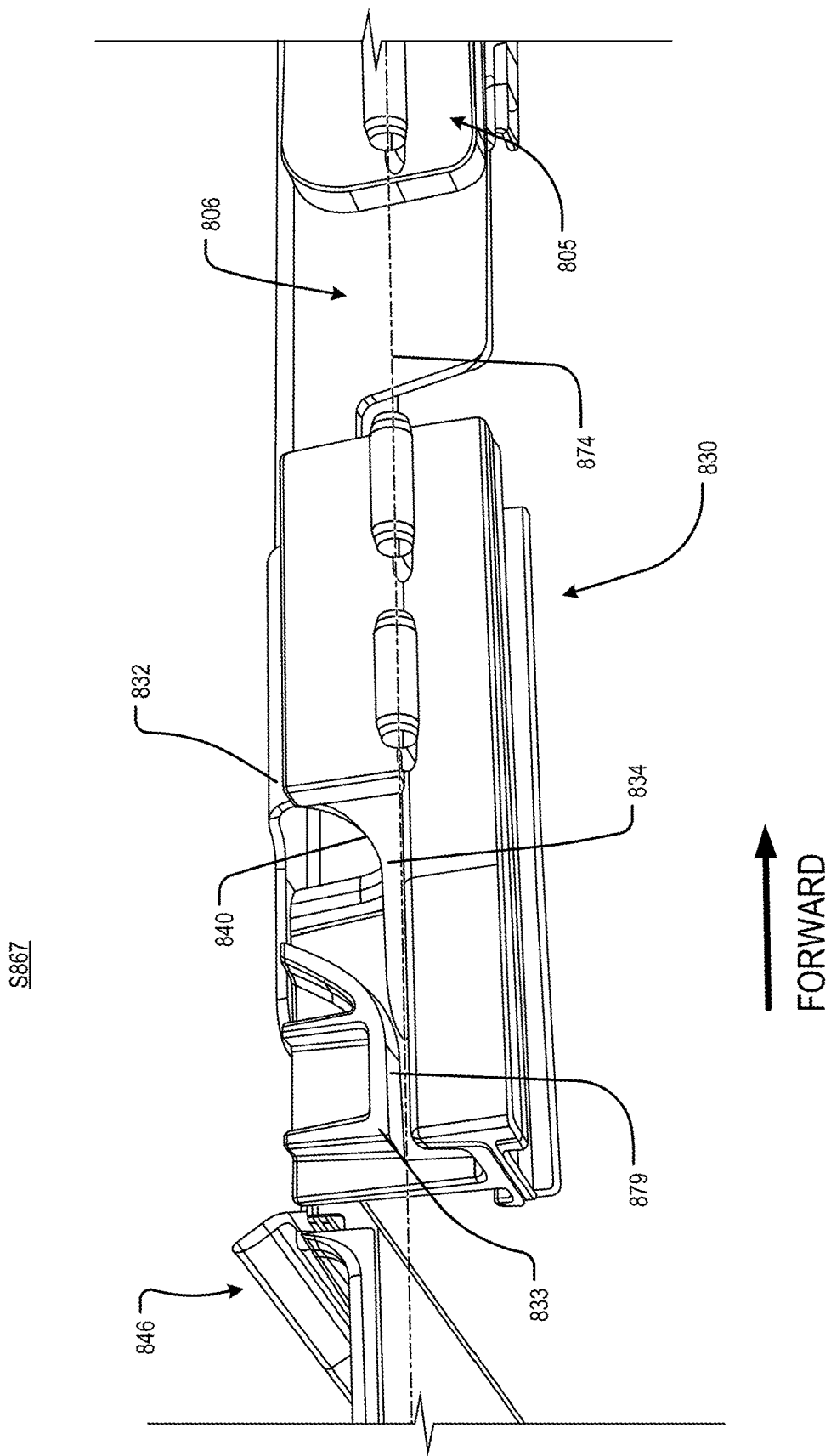

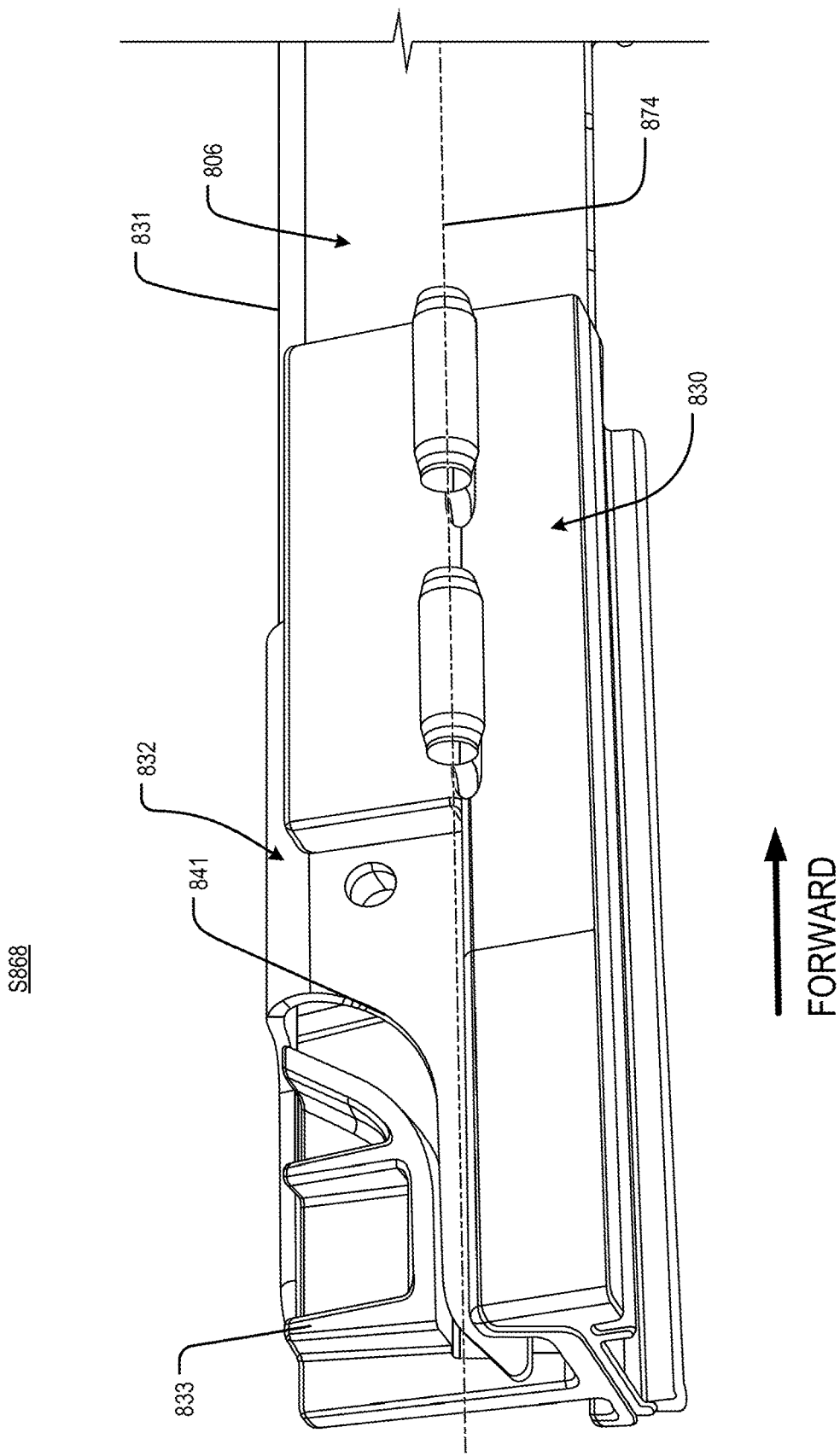

DRIVE LINK APPARATUS FOR USE WITH VEHICLE SUNROOFS

RELATED APPLICATION

This patent arises from a continuation-in-part of U.S. patent application Ser. No. 16/157,823, which was filed on Oct. 11, 2018. U.S. patent application Ser. No. 16/157,823 is hereby incorporated by reference in its entirety. Priority to U.S. patent application Ser. No. 16/157,823 is hereby claimed.

BACKGROUND

Field of the Disclosure

The present disclosure relates to automotive vehicles and, more particularly, to drive link apparatus for use with vehicle sunroofs.

Description of the Related Art

Automotive slide roof systems, often called sunroof apparatuses, are installed in many modern vehicles. Such a sunroof apparatus is often capable of both tilting up a glass panel and sliding it in the fore-and-aft directions to provide two modes of opening a part of a fixed roof of the vehicle. Increasingly, this concept has been expanded to panoramic sunroofs that offer all vehicle passengers freedom of view.

In accomplishing a sunroof apparatus, and especially during high-speed operation when forces generated by passing air are applied to the components of the sunroof apparatus, it is vital that components be supported during opening and closing. Specifically, a tilt angle during opening and a resting position during closing of the glass component of the sunroof apparatus need be sufficiently supported for efficient operation.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

An example assembly for a vehicle sunroof includes a drive shoe. The drive shoe is movable along a rail and includes a ramp portion positioned thereon. The assembly also includes a drive link that is rotatably coupled to the drive shoe and supports a panel. The drive link includes a guide portion that is positioned thereon and configured to slidably engage the ramp portion to prevent the drive link from rotating during a sunroof operation. The guide portion includes an extension that is positioned thereon and interposed between the drive shoe and a guide block. The extension is configured to slidably engage the drive shoe, the ramp portion, or the guide block to prevent the drive link from twisting during the sunroof operation Another example sunroof assembly for a vehicle includes a drive shoe. The drive shoe is movable along a rail and includes a first channel positioned thereon. The assembly also includes a drive link that is rotatably coupled to the drive shoe and supports a panel. The drive link includes a first protrusion that is positioned thereon and extends at least partially into the first channel. The first protrusion is configured to slidably engage a first surface of the drive shoe forming the first channel to cause the drive link to translate during a sunroof operation. The first protrusion includes a cross-sectional area that is oblong.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4A is an illustration of a guiding drive shoe of a guiding drive shoe assembly of a sunroof apparatus, according to an exemplary embodiment of the present disclosure;

FIG. 5A is a schematic of a first position of a front end of a drive link of a guiding drive shoe assembly of a sunroof apparatus, according to an exemplary embodiment of the present disclosure;

FIG. 5B is a schematic of a second position of a front end of a drive link of a guiding drive shoe assembly of a sunroof apparatus, according to an exemplary embodiment of the present disclosure;

FIG. 5C is a schematic of a third position of a front end of a drive link of a guiding drive shoe assembly of a sunroof apparatus, according to an exemplary embodiment of the present disclosure;

FIG. 7A is a schematic of a rear drive shoe of a rear drive shoe assembly of a sunroof apparatus, according to an exemplary embodiment of the present disclosure;

FIG. 7B is a schematic of a functional bracket of a bracket of a rear drive shoe assembly of a sunroof apparatus, according to an exemplary embodiment of the present disclosure;

FIG. 8B is an illustration of a second position of a functional bracket of a bracket of a rear drive shoe assembly of a sunroof apparatus, according to an exemplary embodiment of the present disclosure;

FIG. 8C is an illustration of a third position of a functional bracket of a bracket of a rear drive shoe assembly of a sunroof apparatus, according to an exemplary embodiment of the present disclosure;

FIG. 8D is an illustration of a fourth position of a functional bracket of a bracket of a rear drive shoe assembly of a sunroof apparatus, according to an exemplary embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1A:
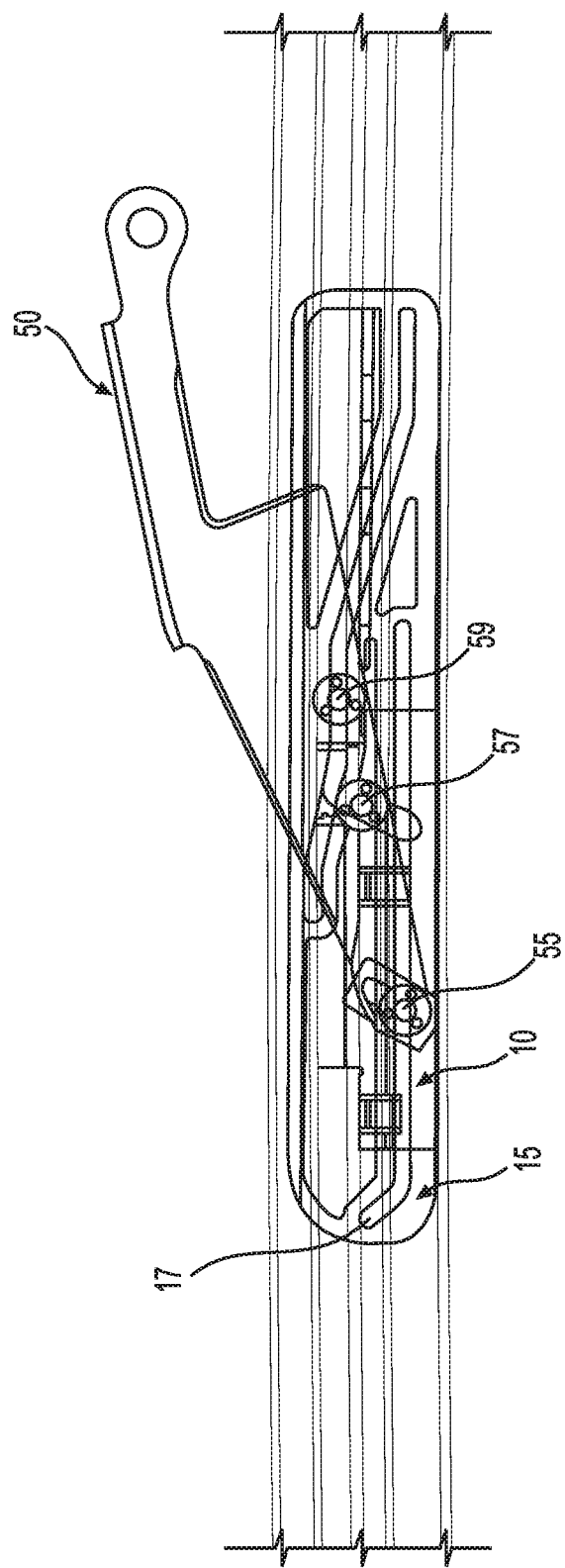
FIG. 1A is an illustration of a component of a sliding apparatus of a sunroof apparatus.
Figure 1B:
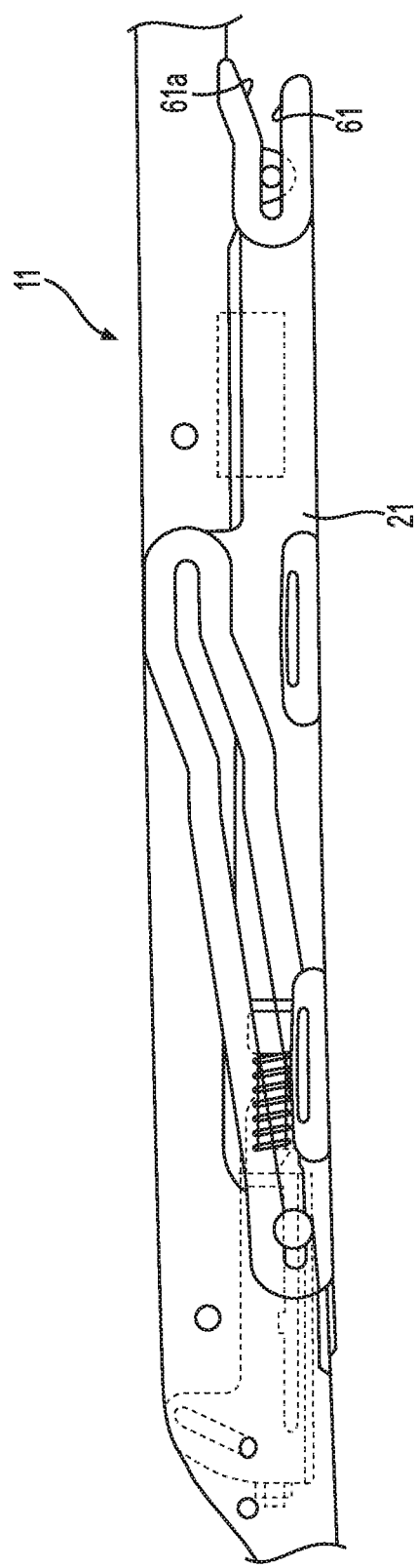
FIG. 1B is an illustration of a component of a sliding apparatus of a sunroof in a venting position.

Sunroof apparatuses available in modern automotive vehicles are comprised of complex mechanical components whose interdependent motion produces the varied sunroof apparatus positions enjoyed by users. In achieving these positions, a variety of approaches to sunroof apparatuses have been deployed. In a first example, as described in U.S. patent application Ser. No. 15/716,045 and with reference to FIG. 1A, a sub-assembly of a sliding mechanism of a sunroof apparatus comprises a lever 50 and a shoe 15, wherein, during an opening motion, the lever 50 is coupled with a glass panel and is configured to rotate about a first pin 55 via motion of a second pin 57 and a third pin 59 within a guide block 10 and the shoe 15. Through this rotation about the first pin 55, the link 50 and glass panel, via a bracket, coupled thereto are tilted into a venting position whereby further manipulation may move the glass panel into a fully open position. In this reference, the first pin 55 freely slides within a first channel 17. In a second example, as described in U.S. Pat. No. 8,876,201 and with reference to FIG. 1B, a spoiler-type, or venting, sunroof includes holding portions on a rear end portion of a sliding member. Specifically, a rear end of a drive shoe 21 comprises a substantially U-shaped holding groove 61 opening rearward of an automotive vehicle and inclined so as to extend upward as the upper portion on the opening end side goes rearward, thereby forming a guiding portion 61*a*. The guiding portion 61*a* allows a sun roof apparatus 11 to obtain a fully-closed position.

Considered in the context of the above-described references, the present disclosure describes structural modifications for improved function during opening and closing of a sunroof apparatus. Specifically, and in order to improve efficiency in full operation of the sunroof apparatus, two components of the sunroof apparatus are addressed. First, a guiding drive shoe assembly, configured to tilt a glass panel and slide within a guide rail to translate the glass panel towards the rear of the vehicle, is modified to provide rotational control to a drive link of the drive shoe assembly. Second, a rear drive shoe assembly is configured to receive and guide a rear end of a functional bracket such that a fully-closed glass panel can be achieved.

Some other known vehicle sunroofs include a drive link or lever having cylindrically shaped (i.e., non-oblong) guide pins that are configured to slide through respective channels of a drive shoe when opening or closing a sunroof, which causes a sunroof panel to move. However, such known guide pins are prone to mechanical failure (e.g., plastic deformation, cracking, fracturing, etc.) in response to the drive link receiving and/or experiencing relatively large force(s), for example, generated during a vehicle rollover event. Thus, such known sunroofs are not appropriate for certain driving conditions and/or driving events and, as a result, may comprise vehicle occupants and/or increase risk of injury to vehicle occupant(s). Additionally or alternatively, when opening or closing the sunroof, these drive links tend to substantially twist, which may dislodge the guide pin(s) from the respective guide channel(s) and/or otherwise adversely affect operation of the drive link and the drive shoe. As a result, the sunroof may generate undesired noise and/or may not function properly during operation.

Drive link apparatus for use with vehicle sunroofs are disclosed. Examples disclosed herein provide an example drive shoe and an example drive link for a vehicle sunroof (e.g., a panoramic sunroof). The disclosed drive shoe is configured to move (e.g., via a motor) along a sunroof rail. The drive link is coupled to and/or otherwise supports a sunroof panel. Further, the disclosed drive link is rotatably coupled to the drive shoe whereby movement of the drive shoe relative to the drive link causes the drive link to rotate to move (e.g., raise, lower, and/or tilt) the sunroof panel, for example, relative to one or more joints associated with the drive link and the drive shoe. In some examples, the drive link includes one or more example guide protrusions (e.g., one or more pins) that are positioned thereon and extend at least partially into respective guide channel(s) of the drive shoe. In particular, a disclosed protrusion is configured to slidably engage a surface (e.g., an inner surface) of the drive shoe forming one of the channel(s) to cause the drive link to translate (e.g., rotate, raise, and/or lower).

Some disclosed examples provide an example ramp portion positioned on the drive shoe. Further, such disclosed examples also provide a guide portion that is positioned drive link and configured to slidably engage the ramp portion, thereby substantially preventing rotation of the drive link during an operation (e.g., a closing operation and/or an opening operation) of the sunroof. In particular, the guide portion includes an example guide extension that is positioned thereon and interposed between the drive shoe and an example guide block. The disclosed extension is configured to slidably engage one or more of the drive shoe, the ramp portion, and/or the guide block (e.g., when the guide portion is positioned on or near the ramp portion), thereby substantially preventing the drive link from twisting during the sunroof operation, as discussed in greater detail below in connection with FIGS. 11-13. As a result, the disclosed extension improves performance of the drive link and the drive shoe, for example, by preventing the protrusion(s) from exiting the respective channel(s) and/or otherwise by reducing, mitigating, and/or eliminating adverse effect(s) that would have otherwise been caused by using the above-mentioned known vehicle sunroofs.

Additionally or alternatively, in some examples, a disclosed protrusion includes a cross-sectional area that is oblong, as discussed in greater detail below in connection with FIGS. 14-16, 17A, and 17B. Such an oblong shape provides increased strength and/or rigidity associated with a disclosed guide protrusion such that the protrusion is less prone to mechanical failure, for example, compared to a non-oblong pin or a cylindrically shaped pin. In particular, the disclosed guide protrusion(s) improve a loading capacity of the drive link without increasing packaging size associated with the drive link and/or the drive shoe. As a result, disclosed examples enable the protrusion(s) and/or the drive link to withstand relatively large force(s) or load(s) during certain driving conditions and/or events (e.g., a vehicle rollover) while saving space within the sunroof, which would have otherwise been unattainable using the above-mentioned known sunroofs. In this manner, disclosed examples improve vehicle safety and/or performance of the vehicle sunroof.

Figure 2:
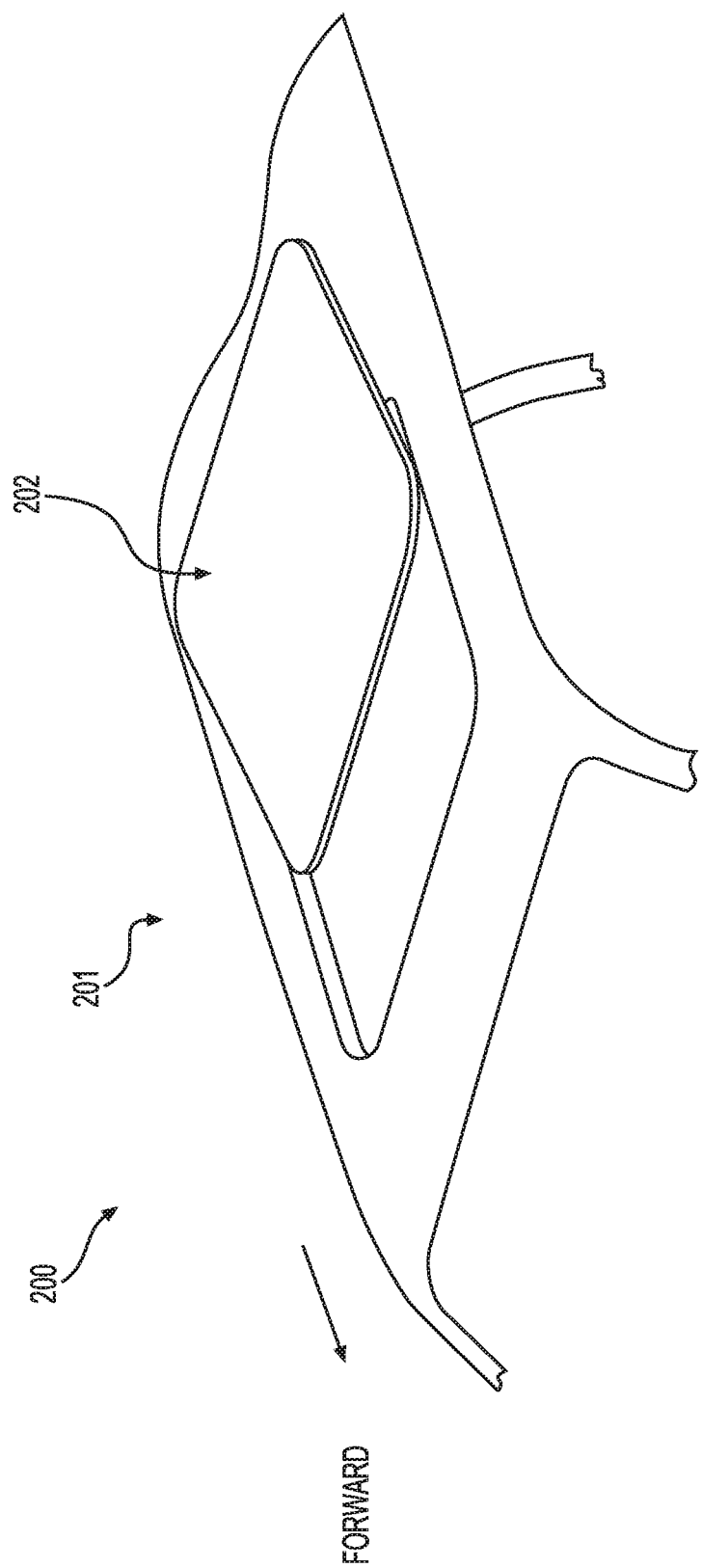
FIG. 2 is a schematic of a sunroof apparatus of an automotive vehicle, according to an exemplary embodiment of the present disclosure.

As background, and in order to orient the reader, FIG. 2 is a schematic of a sunroof apparatus of an automotive vehicle. According to an embodiment, the sunroof apparatus is in a fully-opened position.

Typically, a sunroof apparatus 200 of an automotive vehicle 201 includes a glass panel 202 capable of being tilted into a venting position or being slid relative to a roof of the automotive vehicle 201. In an embodiment, the glass panel 202 slides from the front of the automotive vehicle 201 toward the rear of the automotive vehicle 201. To this end, the glass panel is connected to a sliding mechanism that is configured to move the glass panel 202 from a closed position to a titled position, and finally to a fully-opened position, and vice-versa. Alternatively, in an embodiment, the glass panel 202 is hinged such that the glass panel 202 can directly open without first occupying an intermediate position, such as a tilted position.

During the process of sliding the sunroof apparatus, and the glass panel therein, internal and external environmental conditions may impact the ability of the sunroof apparatus to function optimally. In an example, with the sunroof apparatus in a fully-opened position, a drive link connecting a guiding drive shoe and a bracket coupled to a glass panel may be stressed about a rotation center, wherein rotation of the drive link is minimally constrained. Especially at high-speeds, improving control of forces applied to the drive link about the rotation center may improve efficiency and durability of the component. With respect to a closed position, and in an example, forming an air-tight seal between a glass panel coupled to a bracket and a glass panel seal surrounding the trim of a sunroof apparatus housing relies on movement of a guiding drive shoe and guide channels therein, a state difficult to achieve especially during high-speed operation. An inability to achieve an air-tight, fully closed position creates a noise concern for cabin occupants.

With respect for brevity, the below-described embodiments of the present disclosure are non-limiting examples and, as can be appreciated, components other than those explicitly described may be required for implementation, as would be understood by one of ordinary skill in the art.

Opening Operation of Sunroof Apparatus

Figure 3:
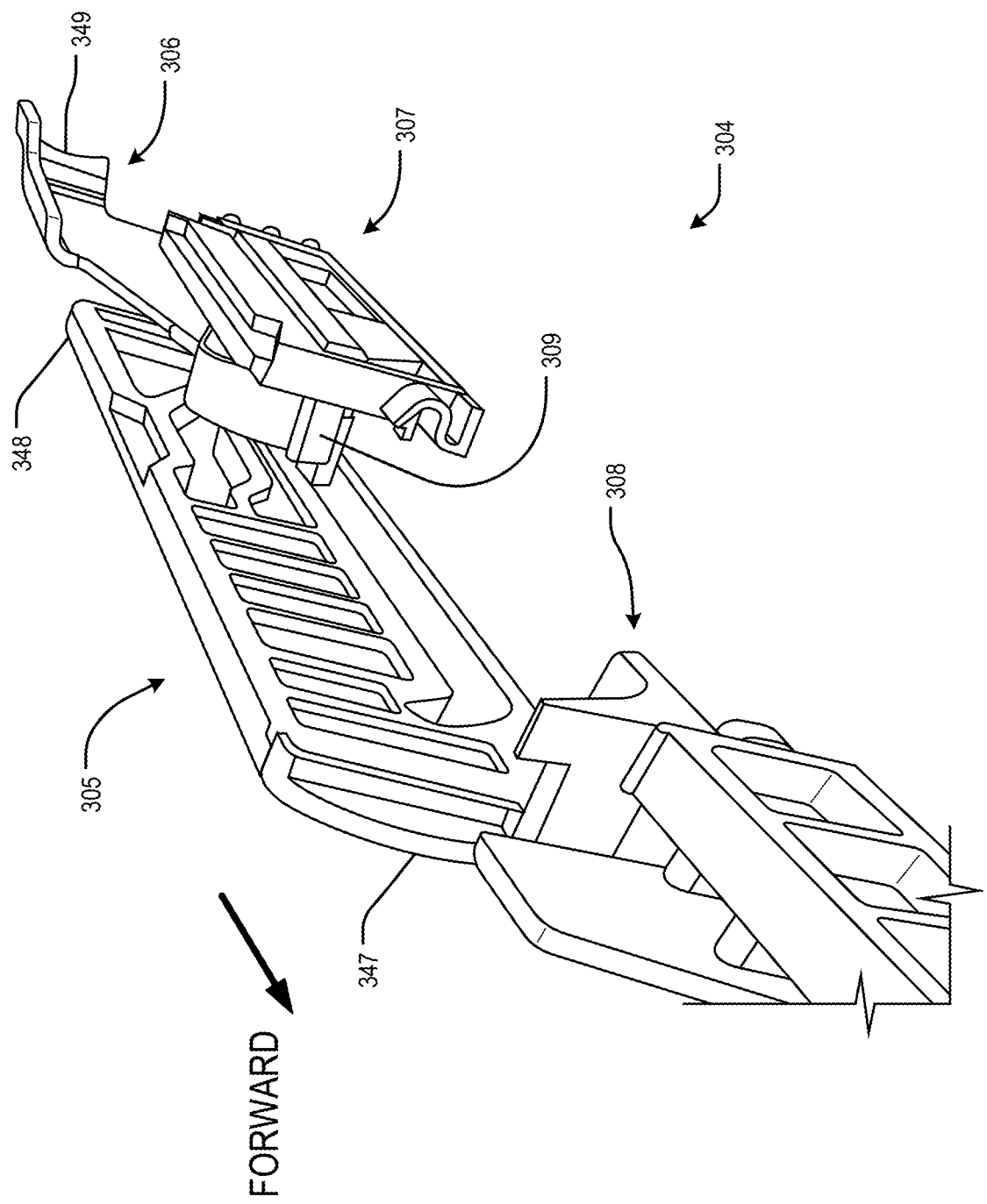
FIG. 3 is an illustration of a guiding drive shoe assembly of a sunroof apparatus, according to an exemplary embodiment of the present disclosure.

In addressing the above-described limitations, the present disclosure first describes a guiding drive shoe having a constraining portion for alleviating undo stresses, or binding, on a drive link. FIG. 3 is a schematic of a guiding drive shoe 305 of a guiding drive shoe assembly 304 of a sunroof apparatus. The guiding drive shoe 305 includes a forward end 347 and a rearward end 348. In an embodiment, the guiding drive shoe 305 is operably-coupled to a drive link 306, the drive link 306 being operably-coupled to a guide block 307. The drive link 306 may be operably-coupled to the guiding drive shoe 305 via one or more pins slidably-coupled within one or more guide channels of the guiding drive shoe 305. In an embodiment, the drive link 306 has a forward portion 309 and a rear portion 349. A constrained portion, further described in FIG. 4A, is disposed at the forward portion 309 of the drive link 306, wherein the forward portion 309 of the drive link 306 is oriented towards the front of the automotive vehicle. In an embodiment, the constrained portion is constrained by a constraining portion 308 disposed at the forward end 347 of the guiding drive shoe 305.

During operation of the sunroof apparatus, moving from a closed position to a fully-opened position, the guiding drive shoe 305 is driven along a guide rail of the sunroof apparatus, the guide rail being oriented along an axis substantially parallel to a plane of a roof of the automotive vehicle. The guiding drive shoe 305 is driven, for example, by a motor (not shown) including, among others, an electric motor. As shown in FIG. 4A, when translating the guiding drive shoe 405 during sunroof apparatus operation, from the fore of the automotive vehicle aft, a drive link slides within one or more guide channels 424 of the guiding drive shoe 405. In an embodiment, a first pin of one or more pins of the drive link is slidably-coupled within a first guide channel 410 of the one or more guide channels 424 and a second pin of the one or more pins of the drive link is slidably-coupled within a second guide channel 411 of the one or more guide channels 424. Upon nearing a fully-opened position, the drive link abuts a constraining portion 408 at a forward end 447 of the guiding drive shoe 405. In an embodiment, the constraining portion 408 is configured for constraining a forward portion of the drive link such that, as the second pin of the drive link approaches an apex of the second guide channel 411, a constrained portion of the drive link contacts the constraining portion 408 of the guiding drive shoe 405 and rotation of the drive link, therein, is controlled.

Figure 4B:
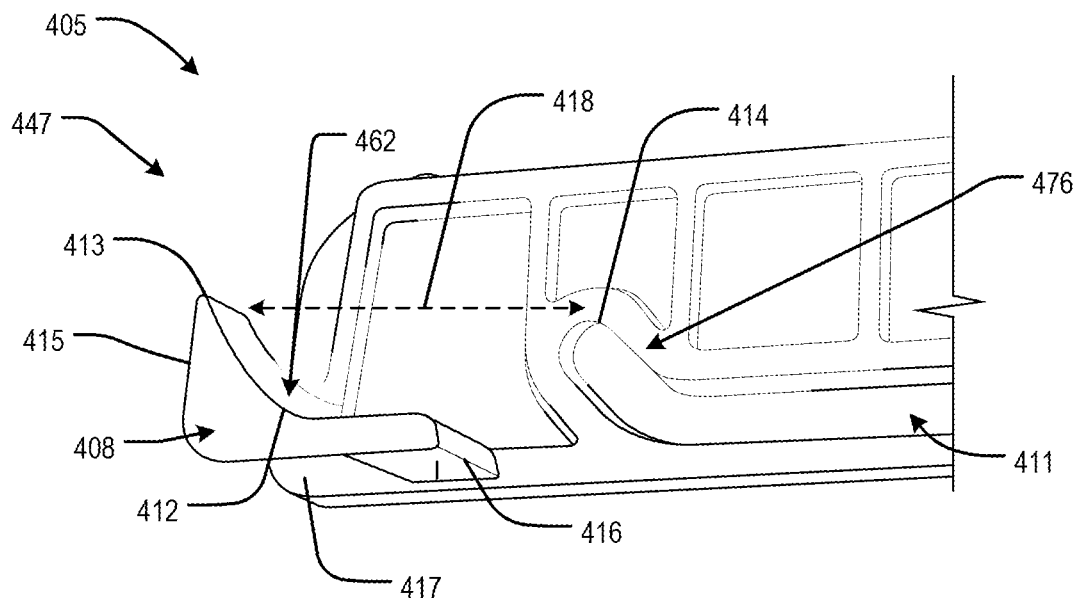
FIG. 4B is a schematic of a front end of a guide shoe of a guiding drive shoe assembly of a sunroof apparatus, according to an exemplary embodiment of the present disclosure.

In an embodiment, and as shown in FIG. 4B, the forward end 447 of the guiding drive shoe 405 is configured such that rotation of the drive link, about a rotation center, is controlled. To this end, the forward end 447 of the guiding drive shoe 405 includes a forward end of the second guide channel 411 and the constraining portion 408. An apex of the constraining portion 413 and an apex of the second guide channel 414 are separated by an inter-apex distance 418. In an embodiment, the inter-apex distance 418 is defined by a dimension of a constrained portion of the drive link, wherein the dimension of the constrained portion of the drive link is determined such that an estimated force is sustained during operation of the sunroof apparatus. In another embodiment, the inter-apex distance 418 is determined based upon a distance from the apex of the second guide channel 414 to a rearward end of the drive link, wherein the inter-apex distance is a pre-determined fraction of the distance from the apex of the second guide channel 414 to the rearward end of the drive link.

In an embodiment, the constraining portion 408 of the forward end 447 of the guiding drive shoe 405 is defined by a first dimension 415, a second dimension 416, and a third dimension 417, wherein the first dimension 415 is related to the apex of the constraining portion 413, the second dimension 416 is related to a width of the constrained portion of the drive link, and the third dimension 417 is related, in part, to the inter-apex distance 418. In an example, the third dimension 417 is equal to a third dimension of the constrained portion of the drive link. Further, an abutting surface 462 is configured for contact with, and guiding of, the constrained portion of the drive link. In an embodiment, the abutting surface 462 is defined by one or more curvatures 412, wherein the one or more curvatures 412 are configured to guide the constrained portion of the drive link. In an embodiment, the one or more curvatures 412 of the abutting surface 462 are congruent with one or more curvatures of an incline 476 of the second guide channel 411 of the guiding shoe drive 405, such that a movement of the second pin of the drive link travels along a similar path to the apex 413 of the constraining portion 408.

In an embodiment, the constraining portion 408 of the forward end 447 of the guiding drive shoe 405 is formed integrally with the guiding drive shoe 405. The guiding drive shoe 405 and constraining portion 408 therein are fabricated via a method selected from a group including milling, machining, cutting, forming, molding, and the like, from a material selected from a group including metallic materials and non-metallic materials such as steel, cast iron, aluminum, plastic, and the like.

Figure 4C:
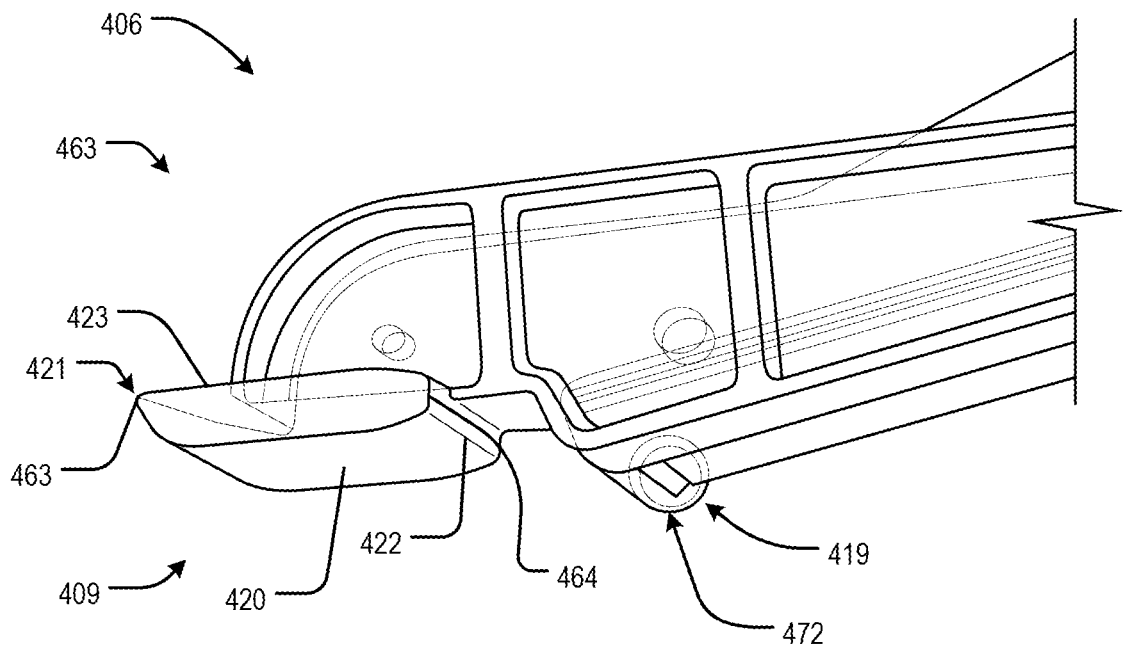
FIG. 4C is a schematic of a front end of a drive link of a guiding drive shoe assembly of a sunroof apparatus, according to an exemplary embodiment of the present disclosure.

In an embodiment, the features of the above-described constraining portion 408 of the guiding drive shoe 405 are determined according to the structure and dimensions therein of a drive link 406, as shown in FIG. 4C. A front portion of the drive link 409 includes a constrained portion 420 having a first dimension 463, a second dimension 422 and a third dimension 423, wherein the first dimension 464 is a thickness of the constrained portion 420 determined such that appropriate torsional forces are sustained, the second dimension 422 is a width of the constrained portion 420, and the third dimension 423 is a length of the constrained portion 420, the length of the constrained portion 420 being related to a distance between a rotation center 472, about a second pin 419, and a forward position on the front portion of the drive link 463. In an example, the first dimension 464, the second dimension 422, and the third dimension 423 are determined such that a force applied to a glass panel, coupled to the drive link 406 via a bracket, are sustained when the sunroof apparatus is in a fully-opened position. In an embodiment, and during translation of the drive link 406 resulting in rotation of the drive link 406 about the rotation center 472, the constrained portion 420 contacts the constraining portion of the guiding drive shoe. To facilitate contact between these components, an abutting surface of the constrained portion 420 of the drive link 406 is defined by one or more curvatures 421, the one or more curvatures 421 being configured for smooth contact between the drive link 406 and the abutting surface of the constraining portion of the guiding drive shoe. In an example, the one or more curvatures 421 of the constrained portion 420 of the drive link 406 are equivalent to the one or more curvatures 412 of the constraining portion 408 of the guiding drive shoe 405.

According to an embodiment, and as shown in FIG. 5A through FIG. 5C, during operation of the sunroof apparatus, the constraining portion of the guiding drive shoe comes into contact with the constrained portion of the drive link in order to control rotation of the drive link about the rotation center. As shown in FIG. 5A, a first position 525 of a drive link 506 relative to a guiding drive shoe 505, a second pin 519 of the drive link 506 is positioned within a second guide channel of the guiding drive shoe 505. As the second pin 519 of the drive link 506 approaches an incline 576 of the second guide channel, a constrained portion 520 of the drive link 506 makes initial contact with a constraining portion 508 of the guiding drive shoe 505. As initial contact is made between the constrained portion 520 and the constraining portion 508, a relationship between a longitudinal axis of the drive link 506 and a longitudinal axis of the guiding drive shoe 505 is formed and defined as a drive link angle 573, or Θ. In an embodiment, the drive link angle 573 is between 2° and 25°. In an example, the drive link angle 573 is 10°. As the guiding drive shoe 505 is translated, the position of the drive link 506 relative to an apex of the second guide channel changes, as shown in FIG. 5B, such that the drive link 506 is moved into a second position relative to the guiding drive shoe 505. As the second pin 519 of the drive link 506 begins an ascent of the incline 576 of the second guide channel, towards the apex of the second guide channel, an abutting surface of the constrained portion 520 of the drive link, defined by one or more curvatures, follows an abutting surface of the constraining portion 508 of the guiding drive shoe. In following a guiding surface of the abutting surface of the constraining portion 508, the drive link angle is maintained while reducing stress about the second pin of the drive link. When the sunroof apparatus has reached a third position, or a fully-opened state 570, as shown in FIG. 5C, the second pin 519 has reached the apex of the second guide channel and a forward position 563 of the constrained portion 520 of the drive link reaches an apex 513 of the constraining portion 508. In an embodiment, in the third position, the second pin 519 of the drive link is a rotation center 572. Unlike traditional approaches, wherein the drive link lacks a constrained portion and is free to rotate about the rotation center, the drive link of FIG. 5C is constrained by contact between the constrained portion 520 of the drive link and the constraining portion 508 of the guiding drive shoe, thus preventing aft-rotation 529 of the drive link on a first side of the rotation center and, consequently, fore-rotation 528 of the drive link about a second side of the rotation center.

As suggested, unlike the controlled translation of the drive link of the above-described process, traditionally, a rotation center of a drive link, lacking a constraint mechanism, is located at a pin disposed at a forward end of the drive link and a drive link angle is maintained through a position of a guiding drive shoe relative to the drive link, and the position of the pin relative to an apex of a second guiding channel, therein. As a result, the drive link angle may be influenced by environmental factors that strain the drive link, resulting in fluctuations of the drive link angle or increased forces within the drive link. As described in the present disclosure, and illustrated in a closed- to fully-opened-embodiment of FIG. 5A through FIG. 5C, the constrained portion of the drive link relieves stresses from the drive link while ensuring a consistent drive link angle, thus impacting longevity of the drive link.

Closing Operation of Sunroof Apparatus

Figure 6:
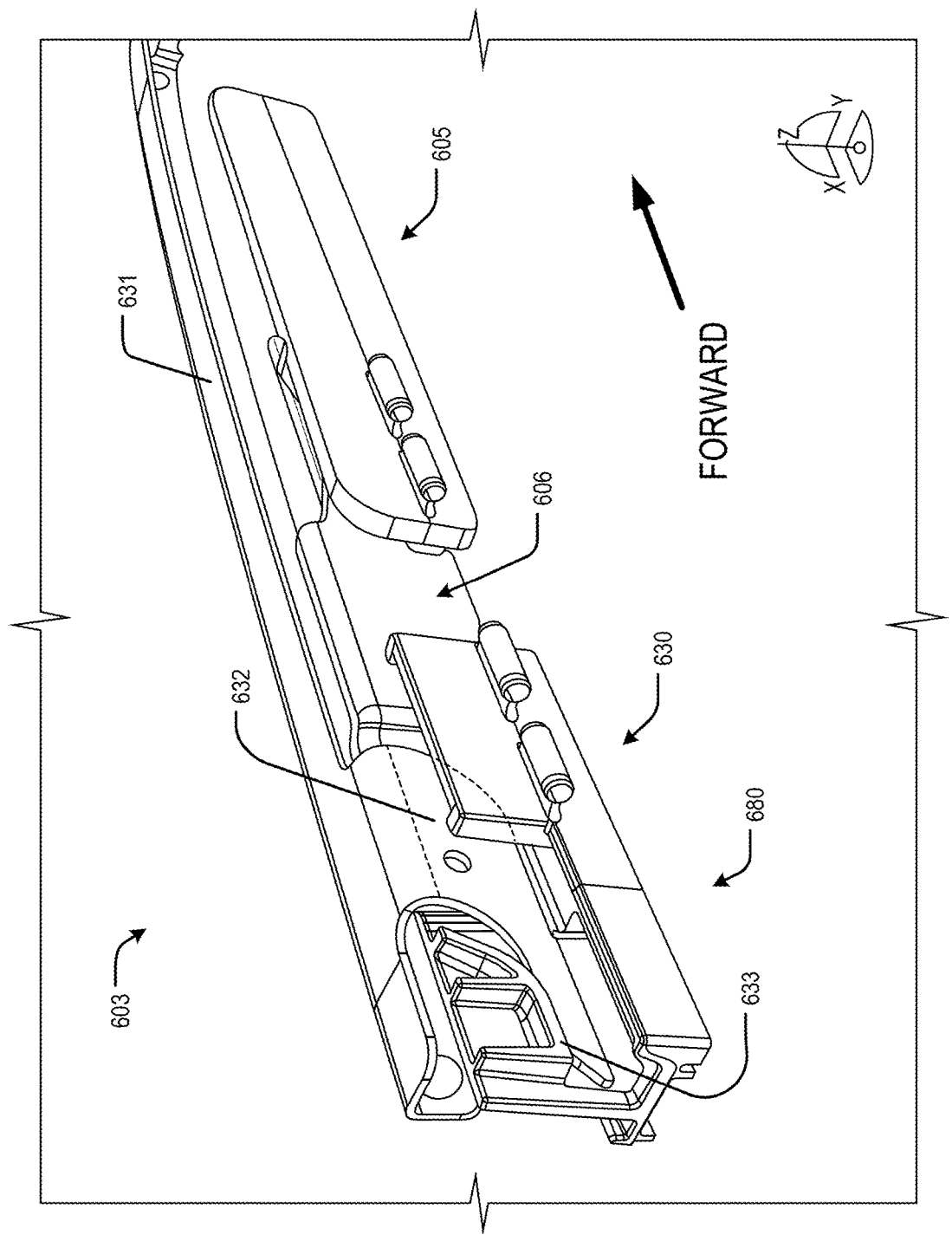
FIG. 6 is an illustration of a rear drive shoe assembly of a sunroof apparatus, according to an exemplary embodiment of the present disclosure.

Upon user request, the sunroof apparatus of the automotive vehicle may enter a closing operation. Traditionally, a closing operation of the sunroof apparatus would proceed as an inverse operation of an opening operation, driven solely by a guiding drive shoe. During high-speed operation, however, such as, for example, during highway driving, a closing operation may be stymied by environmental factors including air resistance and the like. To this end, FIG. 6 is an illustration of a portion of a sunroof apparatus having a sliding mechanism and a rear drive shoe assembly, therein. In an embodiment, a rear drive shoe assembly 680 of a sliding mechanism 603 includes a rear drive shoe 630 and a rear bracket 632, referred to herein as a functional bracket, coupled to a bracket 631, the bracket 631 being configured to be coupled to a glass panel of the sunroof apparatus. In order to couple motion of the functional bracket 632 to motion of a guiding drive shoe 605, a drive link 606 is operably-coupled to the functional bracket 632 of the bracket 631. During a closing operation, the guiding drive shoe 605, and the drive link 606 operably-coupled thereto, are translated toward the fore of an automotive vehicle, moving the glass panel from a third position to a first position, or from an opened position to a fully-closed position. Concurrently, the rear drive shoe 630, having a guiding portion 633, is translated toward the fore of the automotive vehicle such that the guiding portion 633 of the rear drive shoe 630 may contact an abutting surface of the functional bracket 632 of the bracket 631. In an embodiment, translation of the guiding drive shoe 605 and the rear drive shoe 630 is driven, for example, by a motor (not shown) including, among others, an electric motor. Moreover, contact of the guiding portion 632 of the rear drive shoe 630 with the abutting surface of the functional bracket 632 guides the functional bracket 632 and bracket 631 coupled thereto, into a fully-closed position, sealing the glass panel with a roof the automotive vehicle.

According to an embodiment, and as alluded to above, the guiding portion of the rear drive shoe is configured to contact and guide the functional bracket of the bracket such that the glass panel of a sunroof apparatus is moved into a fully-closed position. To this end, FIG. 7A is a schematic of a rear drive shoe 730 of a rear drive shoe assembly. In an embodiment, the rear drive shoe 730 includes a rear bracket slot 781, referred to herein as a functional bracket slot, defined by a space between a wall of the rear drive shoe 730, a floor of the rear drive shoe 730, and a guiding portion 733, the guiding portion 733 having a curvature 735 for contact with an abutting surface of a functional bracket of a bracket. In an embodiment, the functional bracket slot 781 is defined relative to a first dimension 736 of the rear drive shoe 730, the first dimension 736 being a variable dimension according to a guiding surface 735 of the guiding portion 733, a second dimension 737 of the rear drive shoe 730, and a third dimension 738 of the rear drive shoe 730, the third dimension 738 being a dimension of the guiding portion 733. In an example, the first dimension 736, a variable dimension, for instance, is determined according to a corresponding dimension of the functional bracket, such that contact between a guiding surface 779, defined by the guiding surface 735, of the guiding portion 733 and a guided surface of the functional bracket is smooth. In an example, the second dimension 737 is a width of the floor of the rear drive shoe 730 and corresponds, at least, to a corresponding dimension of the functional bracket. In an example, the third dimension 738 is a length of the guiding portion 733 of the rear drive shoe 730, defined, in part, by the guiding surface 735 of the guiding portion 733 and in accordance with a corresponding dimension of the functional bracket. Determination of each of the above-described dimensions is performed within mechanical constraints of the automotive vehicle, wherein the mechanical constraints require minimum levels of mechanical strength of the components of the rear drive shoe assembly. It can be appreciated that the above-described dimensions are non-limiting examples and can be modified according to specific implementations and automotive vehicle requirements.

In an embodiment, the guiding portion 733 of the rear drive shoe 730 is formed integrally with the rear drive shoe 730. The rear drive shoe 730 and the guiding portion 733 therein are fabricated via a method selected from a group including milling, machining, cutting, forming, molding, and the like, from a material selected from a group including metallic materials and non-metallic materials such as steel, cast iron, aluminum, plastic, and the like.

As suggested, the rear drive shoe and guiding portion therein are configured to contact and guide the functional bracket of the bracket during a closing operation. To this end, FIG. 7B is a schematic of a functional bracket 732 of a bracket 731 of the present disclosure. In an embodiment, the functional bracket 732 has a guided portion 734 and is disposed at an aft end of the bracket 731, the bracket 731 being coupled to a glass panel of a sunroof apparatus. The guided portion 734 of the functional bracket 732 is defined by a first dimension 742, a second dimension 743, and a third dimension 744. In an example, the first dimension 742 of the guided portion 734 corresponds to the first dimension of the rear drive shoe defining a dimension of the guiding portion of the rear drive shoe. Specifically, the first dimension 742 defines a distance between a surface of the bracket 731 and a surface of the guided portion 734 of the functional bracket 732, wherein the surface of the guided portion 734 is defined by one or more curvatures. The one or more curvatures of the surface of the guided portion 734 of the functional bracket 732 define an abutting surface 741 and a guided surface 740. The abutting surface 741 of the guided portion 734 is configured such that contact with the guiding portion of the rear drive shoe pushes the guided portion 734, and glass panel connected thereto, in a downward direction. Subsequently, the guided surface 740 of the guided portion 734 is configured such that contact with the guided portion of the rear drive shoe guides the guided portion 734, and glass panel connected thereto, into a fully-closed position. The second dimension 743 defines a width of the guided portion 734 and is determined according to an expected stress applied to the functional bracket 732 during operation. Therefore, the second dimension 743 of the guided portion 734 of the functional bracket 732 is selected such that minimum levels of mechanical strength, in context of estimated mechanical constraints, are met. The third dimension 744 of the guided portion 734 defines a length of the guided portion 734 of the functional bracket 732. In an example, the third dimension 744 may be a variable length along the first dimension 742 of the guided portion 734 of the functional bracket 732 such that the functional bracket 732 is of varying lengths from a bottom of the functional bracket 732 to a top of the functional bracket 732. In order to allow for a fully-closed sunroof apparatus, the third dimension 744 of the guided portion 734 is at least equal to the third dimension of the guiding portion of the rear drive shoe.

During operation, as the guided portion 734 of the functional bracket 732 is guided into the functional bracket slot of the rear drive shoe, the guiding portion of the rear drive shoe moves into a rear drive shoe slot 782 of the functional bracket 732, the rear drive shoe slot 782 being configured to receive the guiding portion of the rear drive shoe and an aft end of a drive link. In an embodiment, the drive link is coupled to the functional bracket 732 via one or more through holes 739. The coupling is accomplished, for example, via bolt and nut mechanism. In coupling the drive link to the functional bracket 732 via the one or more through holes 739, a translation of a guiding drive shoe results in a change in the position of the bracket 731 of the rear drive assembly and thus, a change in the status of the glass panel of the sunroof mechanism.

In an embodiment, the functional bracket 732 of the bracket 731 is formed integrally with the bracket 731. The bracket 731, and the functional bracket 732 coupled thereto, is fabricated via a method selected from a group including milling, machining, cutting, forming, molding, and the like, from a material selected from a group including metallic materials and non-metallic materials such as steel, cast iron, aluminum, plastic, and the like.

By combining the rear drive shoe of FIG. 7A with the functional bracket of FIG. 7B, it is possible to achieve a fully-closed position of the glass panel of the sunroof apparatus, including during high-speed operation, as would be found, for example, during highway travel. It should be appreciated that, though the below-described closing operation reflects a closing operation beginning from an opened position, the same processes can be applied to a sunroof apparatus in a tilted-up position or any other intermediary position between an opened position and a fully-closed position.

Figure 8A:
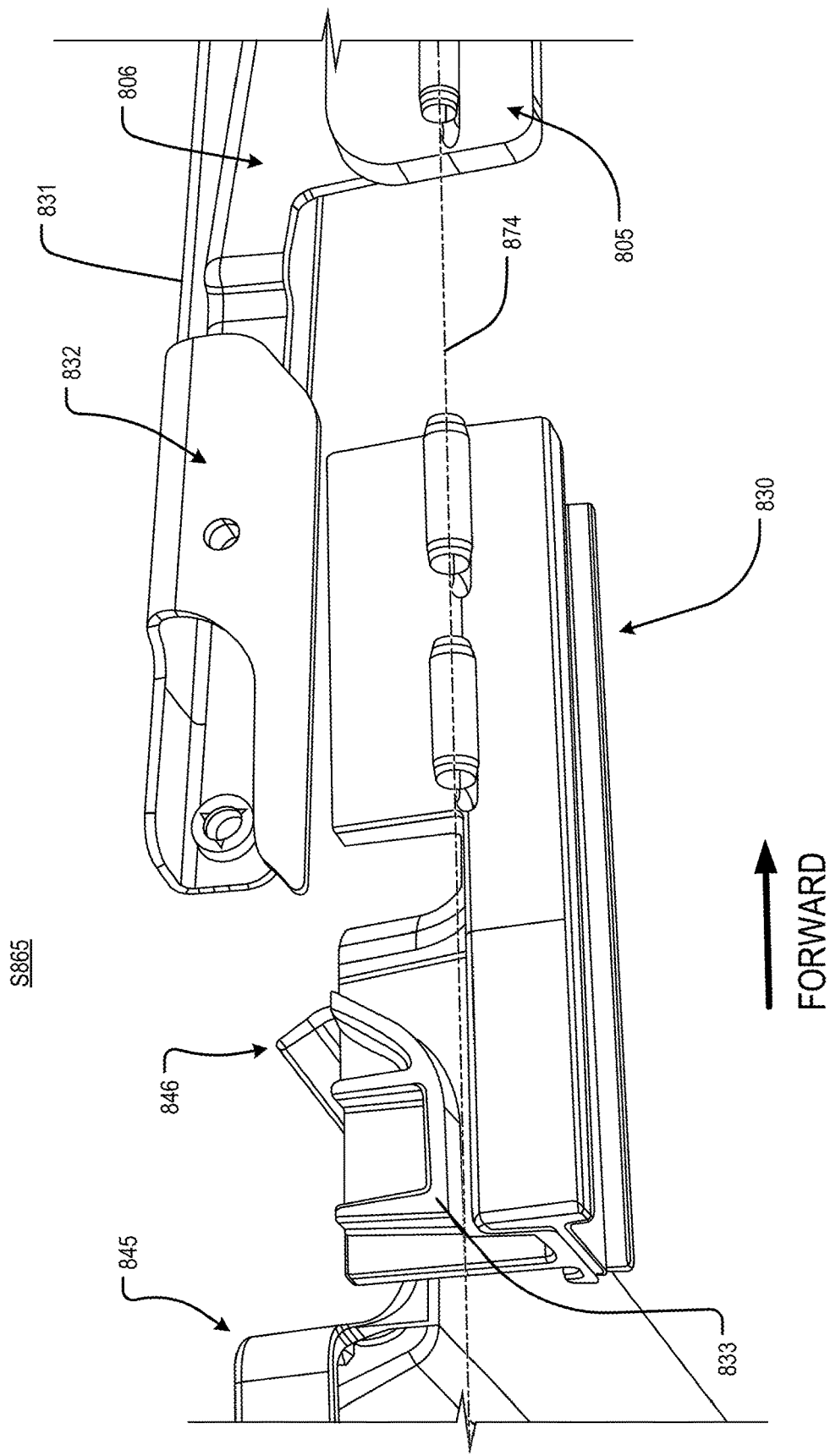
FIG. 8A is an illustration of a first position of a functional bracket of a bracket of a rear drive shoe assembly of a sunroof apparatus, according to an exemplary embodiment of the present disclosure.
Figure 9:
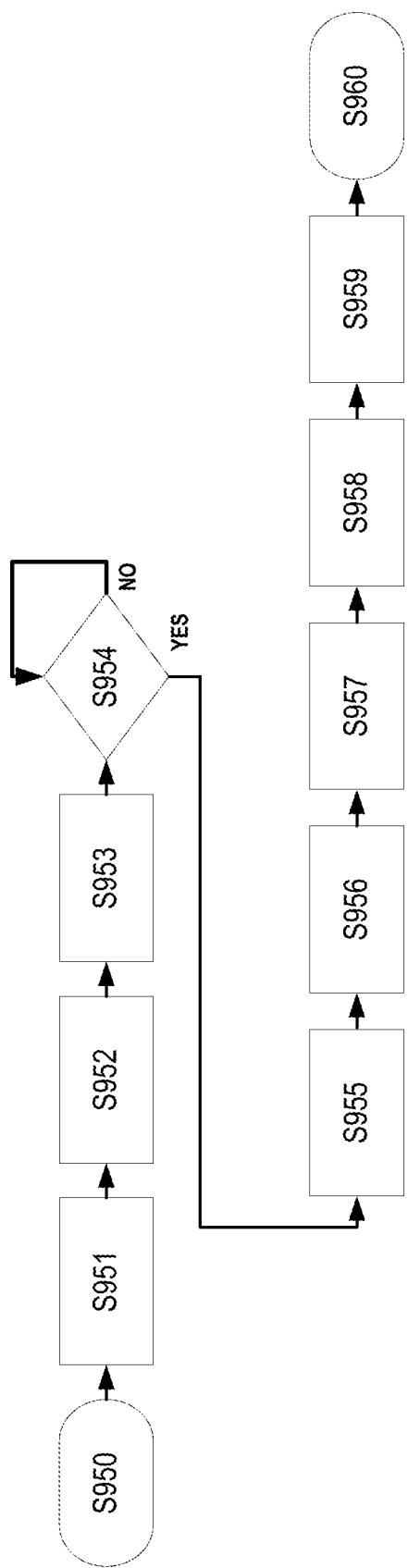
FIG. 9 is a flowchart of operation of a sunroof apparatus employing a guiding drive shoe assembly and a rear drive shoe assembly, according to an exemplary embodiment of the present disclosure.

To this end, FIG. 8A through FIG. 8D is a graphical flowchart of a closing operation of a glass panel of a sunroof apparatus following a user command. Generally, with reference to FIG. 8A, a guiding drive shoe 805 is operably-coupled to a drive link 806 via one or more pins. The drive link 806 is further coupled to a functional bracket 832 of a bracket 831, the bracket 831 being configured to hold the glass panel of the sunroof apparatus. In an embodiment, the functional bracket 832 of the bracket 831 is configured for contact with a guiding portion 833 of a rear shoe drive 830. According to an embodiment, the above-described components are operably-coupled to a sunroof apparatus housing 845, the sunroof apparatus housing 845 further comprising a glass panel seal 846 for ensuring an air-tight seal between the glass panel and a roof of the automotive vehicle during a closing operation. Specifically, however, FIG. 8A describes a first position S865, wherein a closing operation has been initiated. In an embodiment, in the first position S865, the guiding drive shoe 805 and the rear drive shoe 830, components of a sliding mechanism, are translated along a travel axis 874 via one or more motors (not shown) toward the fore of an automotive vehicle. In an embodiment, the guiding drive shoe 805 and the rear drive shoe 830 are translated independently according to an action of a corresponding one of the one or more motors. In an example, the guiding drive shoe 805 and the rear drive shoe 830 are translated via a single motor controlled by a sunroof apparatus control device in order to translate the guiding drive shoe 805 and the rear drive shoe 830 along the travel axis. In the first position S865, an angular relationship between a longitudinal axis of the drive link 806 and a longitudinal axis of the guiding drive shoe 805 is a drive link angle. During the closing operation, the drive link angle is substantially maintained until an axis of a second guide channel of the guiding drive shoe 805 becomes substantially askew of the longitudinal axis of the guiding drive shoe 805. As shown in FIG. 8A, the sunroof apparatus has begun moving from a tilted position toward a fully-closed state, wherein the drive link angle decreases in tandem with the proximity of the functional bracket 832 to the rear drive shoe 830.

FIG. 8B illustrates a second position S866 of the closing operation, wherein the drive link angle is decreased such that, under calm environmental conditions, the glass panel may move into a fully-closed position. Under high-speed operation, however, the proximity of the functional bracket 832 to the glass panel seal 846 may be such that a fully-closed position is not attainable. In the second position S866, as the guiding drive shoe 805 and rear drive shoe 830 continue forward translation along the travel axis 874, an abutting surface 841 of a guided portion of the functional bracket 832 contacts a guiding surface 879 of a guiding portion 833 of the rear drive shoe 830. According to a guiding surface 835 of the guiding portion 833 of the functional bracket 832, the abutting surface 841 is guided down. Following contact of the functional bracket 832 with the guiding portion 833 of the rear drive shoe 830, the drive link angle of the drive link 806 is further decreased in an effort to create an air-tight seal of the glass panel with the glass panel seal 846. In an embodiment, contact of the functional bracket 832 with the guiding portion 833 of the rear drive shoe 830 results in rotation of the drive link 806 about one of the one or more pins slidably-coupled to the guiding drive shoe 805. In an example, movement of the drive link 806 in response to contact between the functional bracket 832 and the guiding portion 833 of the rear drive shoe 830 is purely rotational about one of the one or more pins.

FIG. 8C illustrates a third position S867 of the closing operation wherein, as a result of contact between the guiding portion 833 of the rear drive shoe 830 and the guided portion 834 of the functional bracket 832, the drive link angle of the drive link 806 is substantially decreased. In an embodiment of the third position S867, as forward translation of the guiding drive shoe 805 and the rear drive shoe 830 continues along the travel axis 874, the guiding surface 879 of the guiding portion 833 of the rear drive shoe 830 comes into contact with a guided surface 840 of the guided portion 834 of the functional bracket 832. This contact guides the functional bracket 832 into a functional bracket slot of the rear drive shoe and, concurrently, the guiding portion 833 of the rear drive shoe 830 into a rear drive shoe slot of the functional bracket 832. As translation of the rear drive shoe 830 and guiding drive shoe 805 continues, the drive link angle further decreases as the guiding portion 833 of the rear drive shoe guides the functional bracket 832 downward, bringing the associated glass panel into close proximity with the glass panel seal 846.

To this end, FIG. 8D illustrates a fourth position S868 of the closing operation wherein the functional bracket 832 has been guided via the guiding surface 879 such that the drive link angle of the drive link 806 is zero and adjacent surfaces of the guiding portion 833 of the rear drive shoe 830 and the rear drive shoe slot of the functional bracket 832 are flush.

In an embodiment of the fourth position S868, forward translation along the travel axis 874 is complete, and the glass panel attached to the bracket 831 is seated within the glass panel seal of the sunroof apparatus housing (not shown). With the glass panel in a fully-closed position, the closing operation is completed and the sunroof apparatus control device awaits a subsequent user command.

Full Operation of Sunroof Apparatus

According to an embodiment, the constraining portion of the guiding drive shoe, the constrained portion of the drive link, the guiding portion of the rear drive shoe, and the guided portion of the functional bracket are combined in full operation of a sunroof apparatus. To this end, initially, a sunroof apparatus control device, having a processing circuitry, receives a user command indicating a desired position of the above-described sunroof apparatus S950. In an embodiment, the desired position of the sunroof apparatus is, among others, an opened position or a tilted position. In an example, the desired position of the sunroof apparatus is an opened position. In response, the sunroof apparatus control device initiates translation of the guiding drive shoe and the rear drive shoe in a rearward direction along the travel axis, thereby engaging with one or more pins of the drive link S951.

In order to move the glass panel of the sunroof apparatus into a tilted position, or an intermediary position, the drive link is moved from a first position to a second position wherein one of the one or more pins of the drive link slides within the first guide channel of the guiding drive shoe, thereby increasing the drive link angle and lifting the glass panel S952. Having achieved the second position, or titled position, the guiding drive shoe and rear drive shoe are further translated along the travel axis such that the drive link is moved from the second position to a third position, the third position being an opened position S953. During movement of the drive link from the second position to the third position, contact between the constrained portion of the drive link and the constraining portion of the guiding drive shoe maintains the drive link angle formed at the second position and alleviates environmental stresses applied to the drive link.

In an embodiment, from the third position, the sunroof apparatus control device awaits further command from the user indicating a desired subsequent position of the sunroof apparatus S954. If no command is received, the sunroof apparatus control device continues to monitor a user interface until such a command is received. Upon receiving a user command to initiate a closing operation, the guiding drive shoe and the rear drive shoe are translated in a forward direction S956. As the drive link is moved from the third position to the second position, the constraining portion of the guiding drive shoe and the constrained portion of the drive link maintain a drive link angle S957. In an embodiment, following the second position, the drive link angle begins to decrease as the guiding drive shoe and the rear drive shoe are further translated and one of the one or more pins slides within the first guide channel of the guiding drive shoe. In cases of highway travel, for example, upon reaching the first position S958, the drive link angle may be non-zero. To this end, as the guiding drive shoe and rear drive shoe are translated forward, the guiding surface of the guiding portion of the rear drive shoe contacts the abutting surface of the guided portion of the functional bracket, guiding the functional bracket downward S959. As the functional bracket is rotated aft about one of the one or more pins of the drive link in response to being guided by the guiding portion of the rear drive shoe, the glass panel is brought into close proximity with the glass panel seal of the sunroof apparatus housing. With the drive link angle having reached zero and an air tight seal being formed between the glass panel and the glass panel seal of the sunroof apparatus housing in a fully-closed position, the sunroof apparatus control device awaits a subsequent user command.

Figure 10:
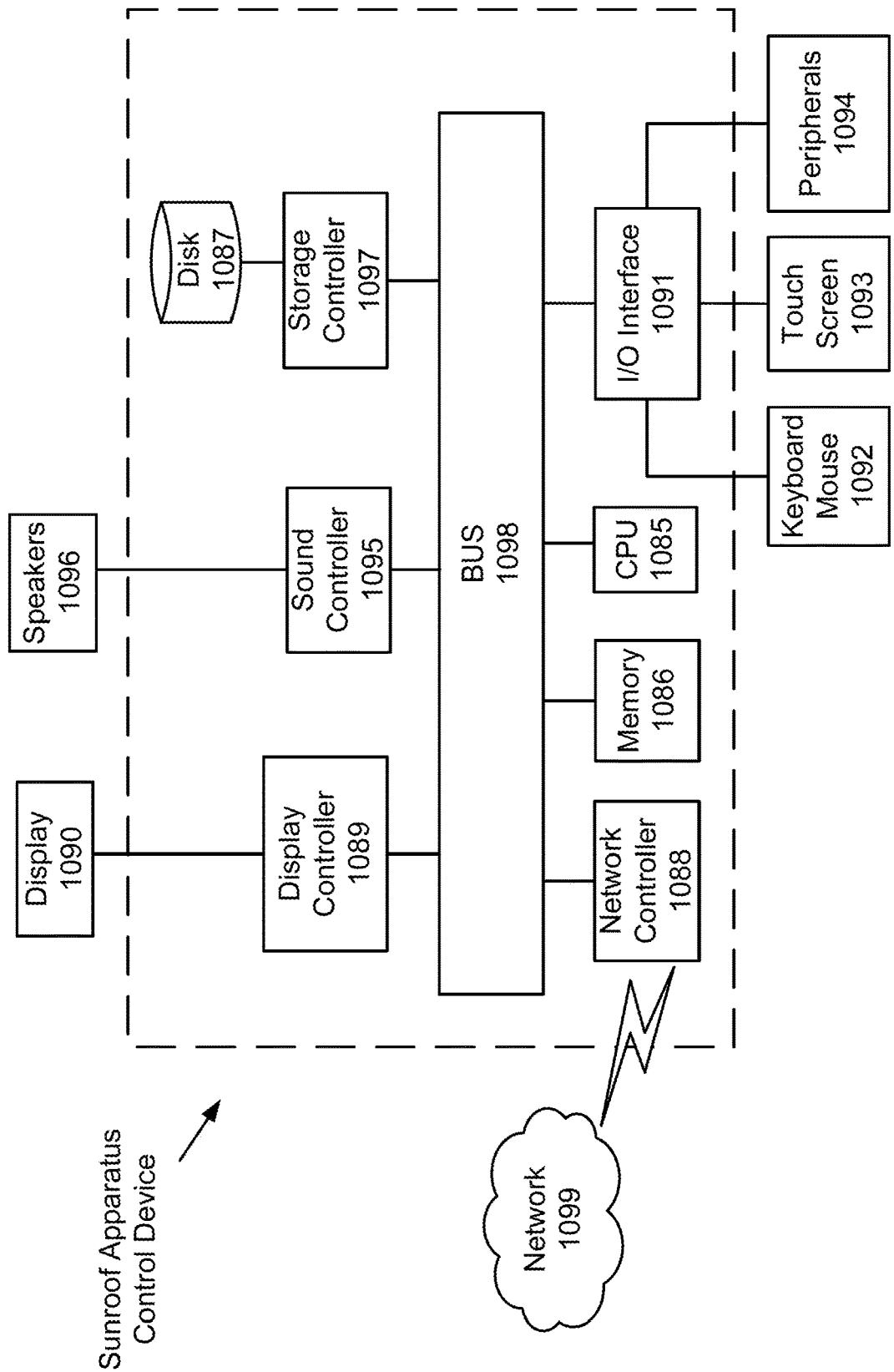
FIG. 10 is a hardware schematic of a sunroof apparatus control device, according to an exemplary embodiment of the present disclosure.

Next, a hardware description of the sunroof apparatus control device according to exemplary embodiments is described with reference to FIG. 10. In FIG. 10, the sunroof apparatus control device includes a CPU 1085 which performs the processes described above. The process data and instructions may be stored in memory 1086. These processes and instructions may also be stored on a storage medium disk 1087 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the sunroof apparatus control device communicates, such as a server or computer.

Further, the claimed advancements may be provided as a utility application, background daemon, or component of an operating system, or combination thereof executing in conjunction with CPU 1085 and an operating system such as Microsoft Windows 7, UNIX, Solaris, LINUX, Apple MAC-OS and other systems known to those skilled in the art.

The hardware elements in order to achieve the sunroof apparatus control device may be realized by various circuitry elements, known to those skilled in the art. For example, CPU 1085 may be a Xenon or Core processor from Intel of America or an Opteron processor from AMD of America, or may be other processor types that would be recognized by one of ordinary skill in the art. Alternatively, the CPU 1085 may be implemented on an FPGA, ASIC, PLD or using discrete logic circuits, as one of ordinary skill in the art would recognize. Further, CPU 1085 may be implemented as multiple processors cooperatively working in parallel to perform the instructions of the inventive processes described above.

The sunroof apparatus control device in FIG. 10 also includes a network controller 1088, such as an Intel Ethernet PRO network interface card from Intel Corporation of America, for interfacing with network 1099. As can be appreciated, the network 1099 can be a public network, such as the Internet, or a private network such as an LAN or WAN network, or any combination thereof and can also include PSTN or ISDN sub-networks. The network 1099 can also be wired, such as an Ethernet network, or can be wireless such as a cellular network including EDGE, 3G and 4G wireless cellular systems. The wireless network can also be WiFi, Bluetooth, or any other wireless form of communication that is known.

The sunroof apparatus control device further includes a display controller 1089, such as a NVIDIA GeForce GTX or Quadro graphics adaptor from NVIDIA Corporation of America for interfacing with display 1090, such as a Hewlett Packard HPL2445w LCD monitor. A general purpose I/O interface 1091 interfaces with a keyboard and/or mouse 1092 as well as a touch screen panel 1093 on or separate from display 1090. General purpose I/O interface 1091 also connects to a variety of peripherals 1094 including printers and scanners, such as an OfficeJet or DeskJet from Hewlett Packard.

A sound controller 1095 is also provided in the sunroof apparatus control device, such as Sound Blaster X-Fi Titanium from Creative, to interface with speakers/microphone 1096 thereby providing sounds and/or music.

The general purpose storage controller 1095 connects the storage medium disk 1087 with communication bus 1098, which may be an ISA, EISA, VESA, PCI, or similar, for interconnecting all of the components of the sunroof apparatus control device. A description of the general features and functionality of the display 1090, keyboard and/or mouse 1092, as well as the display controller 1089, storage controller 1095, network controller 1088, sound controller 1095, and general purpose I/O interface 1091 is omitted herein for brevity as these features are known.

FIGS. 11-14 are portion-views of an example assembly 1100 for the sunroof apparatus 200 in accordance with the teachings of this disclosure. In some examples, the assembly 1100 of FIG. 11 corresponds to and/or otherwise is used to implement at least a portion of the aforementioned sunroof apparatus 200. The sunroof apparatus 200 is sometimes referred to as a sunroof and/or a vehicle sunroof. According to the illustrated examples of FIGS. 11-14, the assembly 1100 includes an example drive shoe 1105 and an example drive link 1106 in accordance with the teachings of this disclosure. In some examples, the drive shoe 1105 of FIGS. 11-14 corresponds to and/or is otherwise used to implement one or more other shoes associated with the sunroof apparatus 200 such as, for example, one or more of the guiding drive shoe 305 of FIG. 3, the guiding drive shoe 405 of FIGS. 4A and 4B, the guiding drive shoe 505 of FIG. 5A, the guiding drive shoe 605 of FIG. 6, and/or the guiding drive shoe 805 of FIGS. 8A-C. Additionally or alternatively, in some examples, the drive link 1106 of FIGS. 11-14 corresponds to and/or is otherwise used to implement at least a portion of the sunroof apparatus 200 such as, for example, one or more of the drive link 306 of FIG. 3, the drive link 406 of FIG. 4, the drive link 506 of FIG. 5A, the drive link 606 of FIG. 6, and/or the drive link 806 of FIGS. 8A-D.

Figure 11:
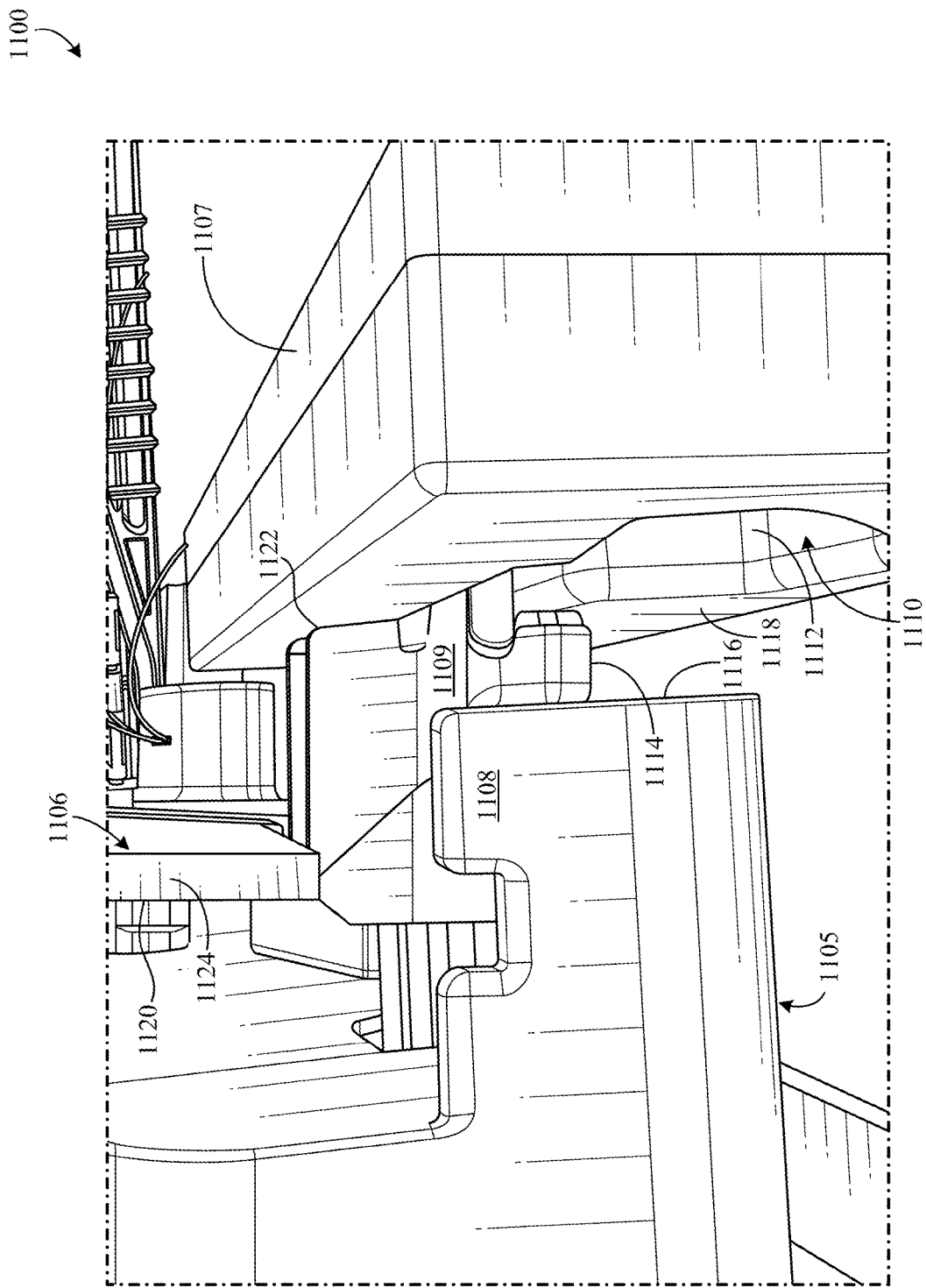
FIGS. 11-14 are portion-views of an example assembly for the sunroof apparatus of FIG. 2 in accordance with the teachings of this disclosure.

According to the illustrated example of FIG. 11, the drive link 1106 is coupled to and/or otherwise configured to support a sunroof panel such as, for example, the glass panel 202 of FIG. 2. For example, the drive link 1106 is coupled to the sunroof panel directly and/or via one or more intermediate components (e.g., a panel bracket). In particular, the drive link 1106 is rotatably coupled, slidably coupled, and/or otherwise operatively coupled to the drive shoe 1105 such that the drive shoe 1105 controls movement of the drive link 1106. For example, the drive link 1106 rotates (e.g., relative to one or more pin joints) in response to the drive shoe 1105 moving relative to (e.g., toward and/or away from) the drive link 1106, thereby raising, lowering, and/or tilting the sunroof panel via the drive link 1106.

The drive shoe 1105 and/or the drive link 1106 are movable along an example sunroof rail associated with the assembly 1100. In some examples, the drive shoe 1105 and/or the drive link 1106 are slidably disposed within one or more guide channels formed by the sunroof rail, which enables the drive shoe 1105 and/or the drive link 1106 to move between one or more predetermined positions relative to the sunroof rail.

In some examples, to resist and/or counteract certain force(s) or load(s) experienced by the drive link 1106, the drive shoe 1105 includes an example ramp portion 1108 positioned thereon. In some such examples, the ramp portion 1108 corresponds to and/or is otherwise used to implement one or more constraining portions associated with the sunroof apparatus 200 such as, for example, one or more of the constraining portion 308 of FIG. 3, the constraining portion 408 of FIGS. 4A and 4B, and/or the constraining portion 508 of FIGS. 5A-C. In particular, the ramp portion 1108 of FIG. 11 is sized, shaped, structured, and/or otherwise configured to receive a portion of the drive link 1106 to control (e.g., resist, limit, and/or prevent) rotation of the drive link 1106 relative to the drive shoe 1105 during one or more sunroof operation(s) associated with the sunroof apparatus 200 such as, for example, during one or more of the aforementioned opening operation of the sunroof apparatus 200, the aforementioned closing operation of the sunroof apparatus 200, etc.

Additionally, in such examples, the drive link 1106 includes an example guide portion 1109 positioned thereon. In some such examples, the guide portion 1109 of FIG. 11 corresponds to and/or is otherwise used to implement one or more constrained portions associated with the sunroof apparatus 200 such as, for example, one or more of the forward portion 309 of FIG. 3, the constrained portion 420 of FIG. 4C, and/or the constrained portion 520 of FIGS. 5A and 5B. In particular, the guide portion 1109 of FIG. 11 is positioned at or near an end of the drive link 1106 and is sized, shaped, structured, and/or otherwise configured to slidably engage the ramp portion 1108 during the sunroof operation(s), which improves drive link performance during certain sunroof operating conditions (e.g., when vehicle 201 is traveling at relative high speeds). In particular, such engagement between the ramp portion 1108 and the guide portion 1109 prevents rotation and/or otherwise undesired movement of the drive link 1106.

In some examples, to facilitate guiding movement of the drive link 1106, the assembly 1100 includes an example guide block 1107. In some such examples, the guide block 1107 of FIG. 11 corresponds to and/or is otherwise used to implement one or more guide blocks associated with the assembly 1100 such as, for example, the guide block 307 of FIG. 3. In particular, the guide block 1107 includes an example channel 1110 positioned thereon that is sized, shaped, structured, and/or otherwise configured to receive the guide portion 1109 and guide movement thereof. That is, the guide portion 1109 of FIG. 11 extends at least partially into the channel 1110 and is configured to slidably engage a first example surface (e.g., an inner surface) 1112 of the guide block 1107 forming and/or defining the channel 1110, as shown in FIG. 11. In this manner, the guide portion 1109 guides movement of the drive link 1106 and/or supports the drive link 1106 during sunroof operation, which improves drive link performance.

In some examples, to prevent twisting and/or otherwise further prevent undesired movement of the drive link 1106, the guide portion 1109 includes one or more example extensions 1114 positioned thereon, one of which is shown in this example. For clarity, FIG. 11 depicts aspects in connection with a single extension 1114. However, in some examples, such aspects likewise apply to one or more other extensions associated with the drive link 1106. The extension 1114 of FIG. 11 is sometimes referred to as guide extension. As shown in FIG. 11, the extension 1114 is interposed between the guide block 1107 and the ramp portion 1108 and/or the drive shoe 1105. In such examples, the extension 1114 is configured to slidably engage opposing surfaces associated with the ramp portion 1108 (and/or the drive shoe 1105) and the guide block 1107, which substantially prevents the drive link 1106 from twisting (e.g., when the vehicle sunroof 200 is opening and/or closing). For example, when the drive link 1106 translates (e.g., resulting from movement of the drive shoe 1105 and/or the guide block 1107) while the extension 1114 is positioned between the drive shoe 1105 and the guide block 1107, the extension 1114 engages a first example surface 1116 of the ramp portion 1108 and/or a second example surface 1118 of the guide block 1107. In this manner, the extension 1114 resists and/or counteracts force(s) or load(s) experienced by the drive link 1106 during the sunroof operation(s) that would have otherwise caused the drive link 100 to twist. As a result, in some examples, the extension 1114 prevents the guide portion 1109 from exiting the channel 1110 of the guide block 1107.

As shown in FIG. 11, the first surface 1116 of the ramp portion 1108 and the second surface 1118 of the guide block 1107 face each other. In some examples, the drive shoe 1105 and the ramp portion 1108 are formed as a single-piece or integral component, for example, via one or more example molding methods or techniques. In such examples, the drive shoe 1105 and/or the ramp portion 1108 may be at least partially constructed of plastic. In particular, in such examples, the first and second surfaces 1116, 1202 of the ramp portion 1108 are surfaces of the drive shoe 1105. Alternatively, in some examples, the drive shoe 1105 and the ramp portion 1108 are produced separately and then coupled together, for example, via one or more example fasteners and/or one or more example fastening methods or techniques. In some such examples, the drive shoe 1105 defines a particular surface, different from the first surface 1116 of the ramp portion 1108, that is configured to similarly engage the extension 1114. Thus, in some examples, to prevent the drive link 1106 from twisting during the sunroof operation(s), the extension 1114 is configured to slidably engage one or more of: (1) the particular surface of drive shoe 1105; (2) the first surface 1116 of the ramp portion 1108; (3) and/or the surface 1118 of the guide block 1107. For example, when the extension 1114 is engaged with this/these surface(s) 1116, 1118, an orientation of the drive link 1106 relative to the drive shoe 1105 is substantially maintained (e.g., the drive link 1106 slightly twists or does not twist).

Although FIG. 11 depicts the assembly 1100 having a single shoe 1105 and a single link 1106, in some examples, the assembly 1100 is implemented using one or more other shoes (e.g., similar and/or different relative to the shoe 1105) in addition or alternatively to the shoe 1105. Further, although FIG. 11 depicts the assembly 1100 having a single link 1106, in some examples, the assembly 1100 is implemented using one or more other links (e.g., similar and/or different relative to the link 1106) in addition or alternatively to the link 1106.

In some examples, the drive link 1106 includes a first example portion (e.g., an arm and/or a lever) 1120 and a second example portion 1122 coupled to the first portion 1120, for example, via one or more example fasteners and/or one or more example fastening methods or techniques (e.g., one or more molding processes such as overmolding, insert molding, injection molding, etc.). According to the illustrated example of FIG. 11, the ramp portion 1108 is positioned at or near a first end 1124 of the first portion 1120. In such examples, the first portion 1120 extends away from the second portion 1122 and/or the ramp portion 1108 to receive a panel bracket (e.g., a bracket supporting the aforementioned glass panel) at or near a second end of the first portion 1120 opposite the first end 1124. For example, the first portion 1120 is coupled to and/or otherwise supports one or more of the aforementioned brackets 631, 632 of FIG. 6, one or more of the aforementioned brackets 731, 732 of FIG. 7, and/or one or more of the aforementioned brackets 831, 832 of FIG. 8. In some such examples, the extension 1114 of FIG. 11 prevents the second end of the drive link 1106 from rotating relative to the first end 1124 and/or vice versa (i.e., prevents twisting of the drive link 1106). Additionally, in some examples, the second portion 1122 of the drive link 1106 forms and/or defines the guide portion 1109.

In some examples, the first drive link portion 1120 includes and/or is at least partially constructed of a first material (e.g., metal such as steel) that is relatively strong and/or rigid, which better provides support to the glass panel and/or improves strength and/or rigidity of the drive link 1106. Further, in such examples, the second drive link portion 1122 includes and/or is at least partially constructed of a second material (e.g., plastic) that is different relative to the first material. In some examples, the second material is not as strong and/or rigid compared to the first material, but the second material has more appropriate sliding properties associated therewith. Further, in such examples, the second material is less dense compared to the first material. As a result, such a combination of the first and second materials reduces weight of the drive link 1106 while improving sliding functionality associated with the drive link 1106 and/or the component(s) thereof.

Figure 12:
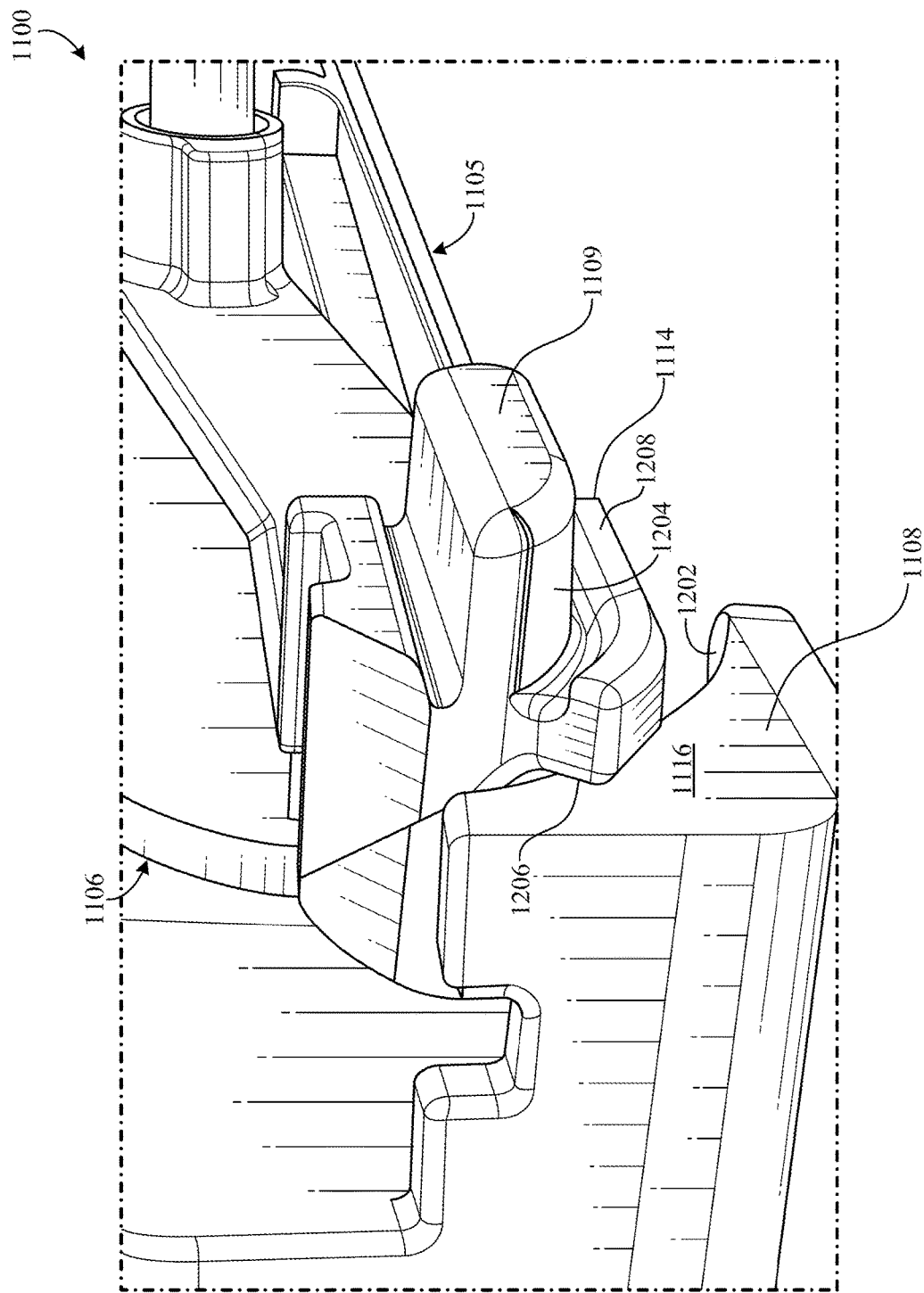

Turning to FIG. 12, the ramp portion 1108 has a second example surface 1202 positioned thereon such as, for example, a sloped surface and/or a curved surface. Additionally, the guide portion 1109 of FIG. 12 has an example surface 1204 positioned thereon such as, for example, a sloped surface and/or a curved surface. In some examples, the second surface 1202 of the ramp portion 1108 corresponds to a topmost (in the orientation of FIG. 12) area of the ramp portion 1108, and the surface 1204 of the guide portion 1109 corresponds to a bottommost (in the orientation of FIG. 12) area of the guide portion 1109, as shown in FIG. 12. In particular, in such examples, the second surface 1202 of the ramp portion 1108 and the surface 1204 of the guide portion 1109 slidably engage each other during the operation(s) of the sunroof apparatus 200, thereby controlling the rotation of the drive link 1106 relative to the drive shoe 1105. For example, such engagement between the ramp portion 1108 and the guide portion 1109 prevents the drive link 1106 from rotating relative to the drive shoe 1105. That is, when the ramp portion 1108 is engaged with the guide portion 1109, an orientation of the drive link 1106 relative to the drive shoe 1105 is substantially maintained (e.g., the drive link 1106 slightly rotates relative drive shoe 1105 or does not rotate relative to the drive shoe 1105). In some examples, these surfaces 1202, 1204 have respective shapes and/or geometries that substantially match each other. That is, in such examples, the second surface 1202 of the ramp portion 1108 is sized and/or shaped to conform to at least a portion of the surface 1204 of the guide portion 1109 and/or vice versa. Additionally, in some examples, at least a portion of the surface 1204 of the guide portion 1109 is configured to slidably engage the first surface 1112 of the guide block 1107.

In some examples, the extension 1114 is positioned on and/or coupled to a portion of the surface 1204 of the guide portion 1109, for example, via one or more example fasteners and/or one or more example fastening methods or techniques. That is, in some examples, the guide portion 1109 and the extension 1114 are formed as a single-piece or integral component, for example, via one or more molding methods or techniques, as shown in FIG. 12. However, in some examples, the guide portion 1109 and the extension 1114 are produced separately and then coupled together.

As shown in FIG. 12, the extension 1114 extends along the surface 1204 of the guide portion 1109. Further, in some examples, the extension 1114 is positioned at or near a central area of the surface 1204 of the guide portion 1109 such that the surface 1204 is divided into two portions on opposite sides of the extension 1114, each of which slidably engages a respective one of the surfaces 1202, 1112. In particular, the extension 1114 of FIG. 12 extends away from the surface 1204 of the guide portion 1109 (i.e., projects from surface 1204) along at least a portion of the first surface 1116 of the ramp portion 1108 and/or the second surface 1118 of the guide block 1107.

In some examples, the extension 1114 has a first example surface 1206 that is positioned on a first side of the extension 1114 and a second example surface 1208 that is positioned on a second side of the extension 1114 opposite the first side, which are sometimes referred to as opposing surfaces 1206, 1208. In particular, the first surface 1206 of the extension 1114 is configured to slidably engage the first surface 1116 of the ramp portion 1108 and/or the particular surface of the drive shoe 1105. Additionally or alternatively, the second surface 1208 of the extension 1114 is configured to slidably engage the second surface 1118 of the guide block 1107. In such examples, the first surface 1206 of the extension 1114 and/or the second surface 1208 of the extension 1114 are substantially smooth. Additionally, in such examples, the first surface 1116 of the ramp portion 1108, the second surface 1118 of the guide block 1107, and/or the particular surface of the drive shoe 1105 are also substantially smooth. As a result, such surfaces 1116, 1118, 1206, 1208 better distribute and/or transfer force(s) or load(s) between each other.

Figure 13:
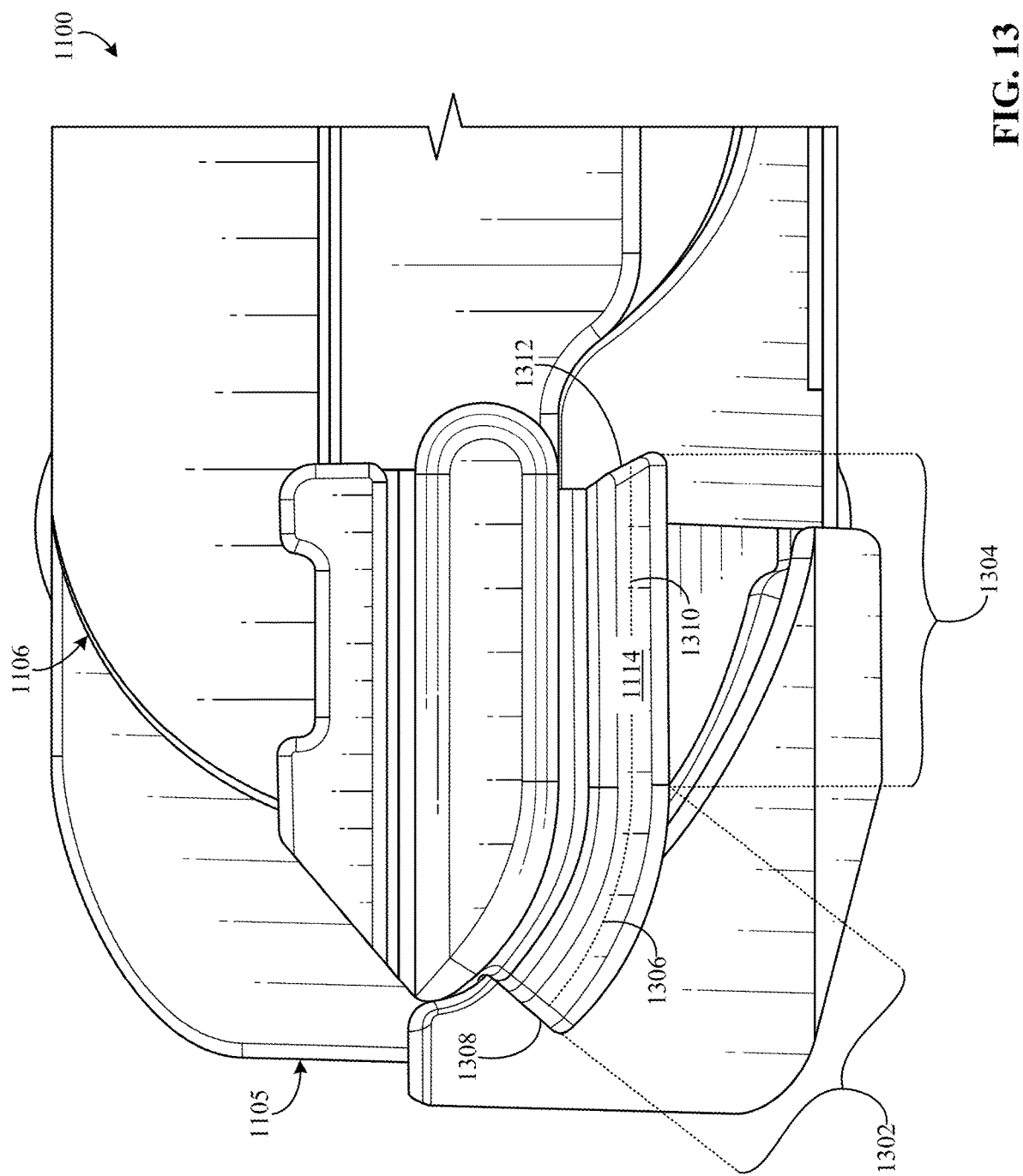

Turning to FIG. 13, the extension 1114 includes one or more example portions 1302, 1304 that are shaped differently relative to each other, two of which are shown in this example (i.e., a first portion 1302 and a second portion 1304). In such examples, the first portion 1302 of the extension 1114 extends along and/or follows a first example path (e.g., a curved path) 1306 from a first end 1308 of the extension 1114 toward a central portion of the extension 1114, as represented by the dotted/dashed lines of FIG. 13. Further, in such examples, the second portion 1304 of the extension 1114 extends along and/or follows a second example path (e.g., straight or linear path) 1310 from a second end 1312 of the extension 1114, opposite the first end 1308, toward the central portion of the extension 1114. Accordingly, the first extension portion 1302 of FIG. 13 is substantially curved, and the second extension portion 1302 of FIG. 12 is substantially straight or linear. In particular, the extension 1114 of FIG. 13 is oblong and/or otherwise has a shape that is substantially oblong. In such examples, the extension 1114 is sometimes referred to as an oblong extension.

Figure 14:
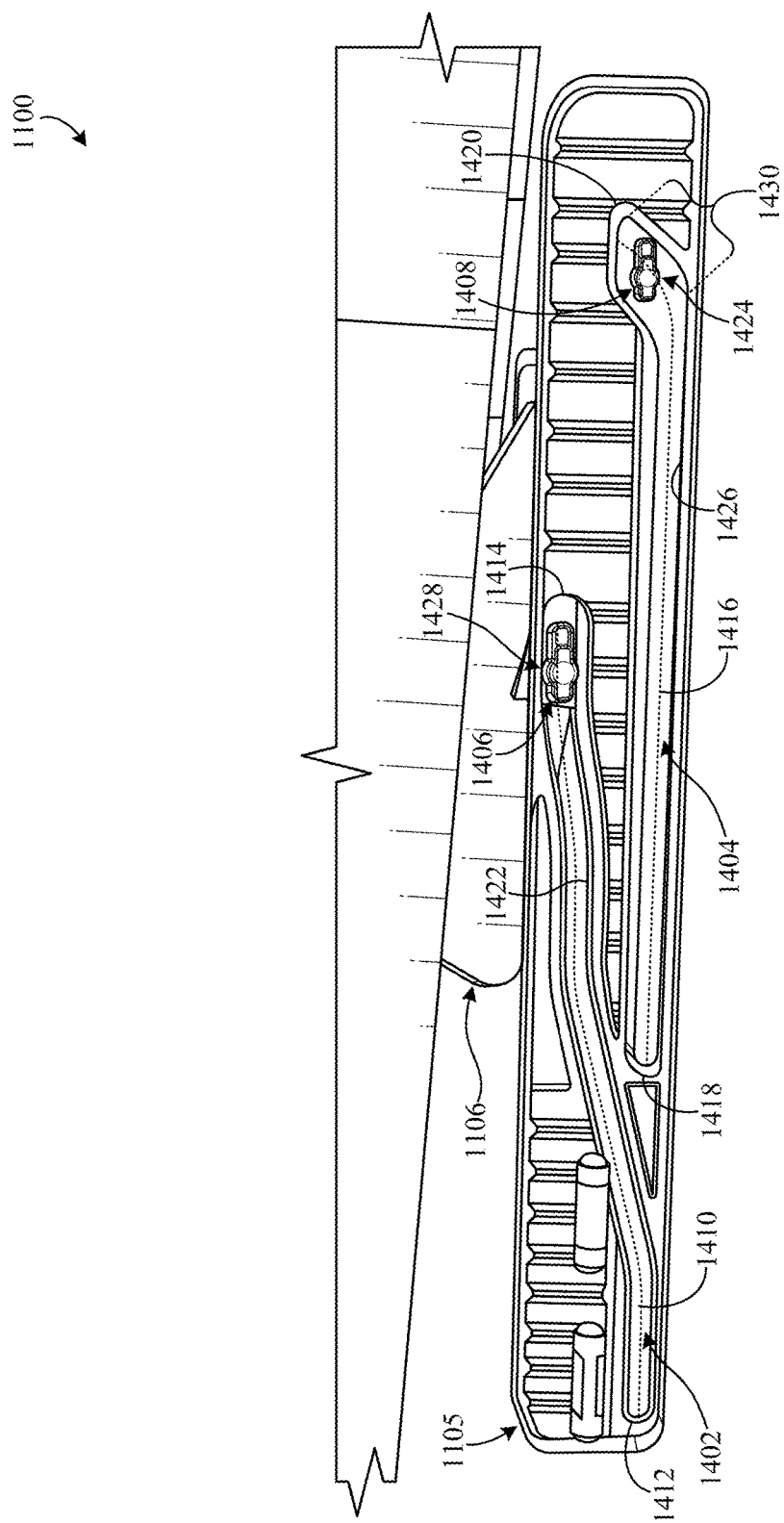

Turning in detail to FIG. 14, the drive shoe 1105 includes one or more example channels 1402, 1404 positioned thereon, two of which are shown in this example (i.e., a first channel 1402 and a second channel 1404). In some examples, the channel(s) 1402, 1404 of the drive shoe 1105 extend through or at least partially into the drive shoe 1105. Additionally, the drive link 1106 includes one or more example protrusions (e.g., one or more pins) 1406, 1408 positioned thereon, two of which are shown in this example (e.g., a first protrusion 1406 and a second protrusion 1408). Each of the protrusion(s) 1406, 1408 is sometimes referred to as a guide protrusion. In particular, the channel(s) 1402, 1404 of FIG. 14 are sized, shaped, structured, and/or otherwise configured to slidably receive respective ones of the protrusion(s) 1406, 1408 and guide movement thereof. For example, the first channel 1402 extends through the drive shoe 1105 to provide a third example path 1410 (as represented by the dotted/dashed lines of FIG. 14) between a first end 1412 of the first channel 1402 and a second end 1414 of the first channel 1402, opposite the first end 1412, along which the first protrusion 1406 is to travel. Similarly, in another example, the second channel 1404 extends through the drive shoe 1105 to a provide a fourth example path 1416 (as represented by the dotted/dashed lines of FIG. 14) between a first end 1418 of the second channel 1404 and a second end 1420 of the second channel 1404, opposite the first end 1418, along which the second protrusion 1408 is to travel.

According to the illustrated example of FIG. 14, the first protrusion 1406 extends at least partially into the first channel 1402. In such examples, when the drive shoe 1105 moves relative to the drive link 1106, the first protrusion 1406 engages a first example surface (e.g., an inner surface) 1422 of the drive shoe 1105 forming and/or defining the first channel 1402. As a result, the first surface 1422 of the drive shoe 1105 urges the first protrusion 1406 to at least partially follow the third path 1410, which facilitates translating the drive link 1106. For example, the first surface 1422 of the drive shoe 1105 imparts a force or load on the first protrusion 1406 during sunroof operation, thereby causing the drive link 1106 to rotate relative to a first example movable joint (e.g., a pin joint) 1424 associated with the assembly 1100. In this manner, the drive shoe 1105 and the drive link 1106 raise, lower, and/or tilt the glass panel.

Similarly, in some examples, the second protrusion 1408 extends at least partially into the second channel 1404. In such examples, when the drive shoe 1105 moves relative to the drive link 1106, the second protrusion 1408 engages a second example surface (e.g., an inner surface) 1426 of the drive shoe 1105 forming and/or defining the second channel 1404. As a result, the second surface 1426 of the drive shoe 1105 urges the second protrusion 1408 to at least partially follow the second path 1416, which further facilitates translating the drive link 1106. For example, the second surface 1426 of the drive shoe 1105 imparts a force or load on the second protrusion 1408 during sunroof operation, thereby causing the drive link 1106 to rotate relative to a second example movable joint (e.g., a pin joint) 1428 associated with the assembly 1100. In this manner, the drive shoe 1105 and the drive link 1106 further raise, lower, and/or tilt the glass panel.

As shown in FIG. 14, the first joint 1424 is spaced from the second joint 1428 by an example distance. Such spacing may be advantageously configured such that the first protrusion 1406 and/or the second protrusion 1408 receive sufficient force(s) or load(s) during sunroof operation to enable the drive link 1106 to sufficiently move the glass panel. In some examples, the first joint 1424 is formed and/or defined by the second protrusion 1408 and the second surface 1426 of the drive shoe 1105. Further, in some examples, the second joint 1428 of FIG. 14 is formed and/defined by the first protrusion 1406 and the first surface 1422 of the drive shoe 1105. In particular, the drive link 1106 is rotatable relative to the first joint 1424 and/or the second joint 1428, for example, in a first rotational direction (e.g., clockwise) and/or a second rotational direction (e.g., counterclockwise) opposite the first rotational direction. Thus, in some examples, movement of the drive shoe 1105 relative to the drive link 1106 causes the drive link 1106 to rotate relative to the first protrusion 1406 and/or the second protrusion 1408.

Thus, changings in one or more of an angular position of the drive link 1106, an orientation of the drive link 1106, and/or a position of the drive link 1106 is based movement of the drive shoe 1105. Although FIG. 14 depicts particular structures and/or configurations associated with the drive shoe 1105, the drive link 1106, the first channel 1402, the second channel 1404, the first protrusion 1406, the second protrusion 1408, and/or, more generally, the assembly 1100, in some examples, one or more of the drive shoe 1105, the drive link 1106, the first channel 1402, the second channel 1404, the first protrusion 1406, the second protrusion 1408, and/or, more generally, the assembly 1100 is/are implemented differently while still maintaining similar functionality associated therewith. For example, the first channel 1402 and/or the second channel 1404 may be sized and/or shaped differently while still allowing the drive shoe 1105 to sufficiently control rotation of the drive link 1106 in response to the drive shoe 1105 moving relative to the drive link 1106. In another example, the first protrusion 1406 and/or the second protrusion 1408 is/are positioned on the drive link 1106 differently (e.g., to change a distance by which the first and second protrusions 1406, 1408 are spaced from each other) while still transferring sufficient force(s) or load(s) to the first drive link portion 1120 to translate the first drive link portion 1120.

In some examples, the second channel 1404 includes an example incline portion 1430, which is associated with the ramp portion 1108. In particular, when the second protrusion 1408 is at or near the second end 1420 of the second channel 1404 (e.g., the second protrusion 1408 is within or approaching the incline portion 1430), the surface 1204 of the guide portion 1109 slidably engages the second surface 1202 of the ramp portion 1108. In such examples, the incline portion 1430 corresponds to an area of the second surface 1426 of the drive shoe 1105 that is sloped and/or curved. As shown in FIG. 14, the incline portion 1430 is positioned at or near the second end 1420 of the second channel 1404.

Figure 15:
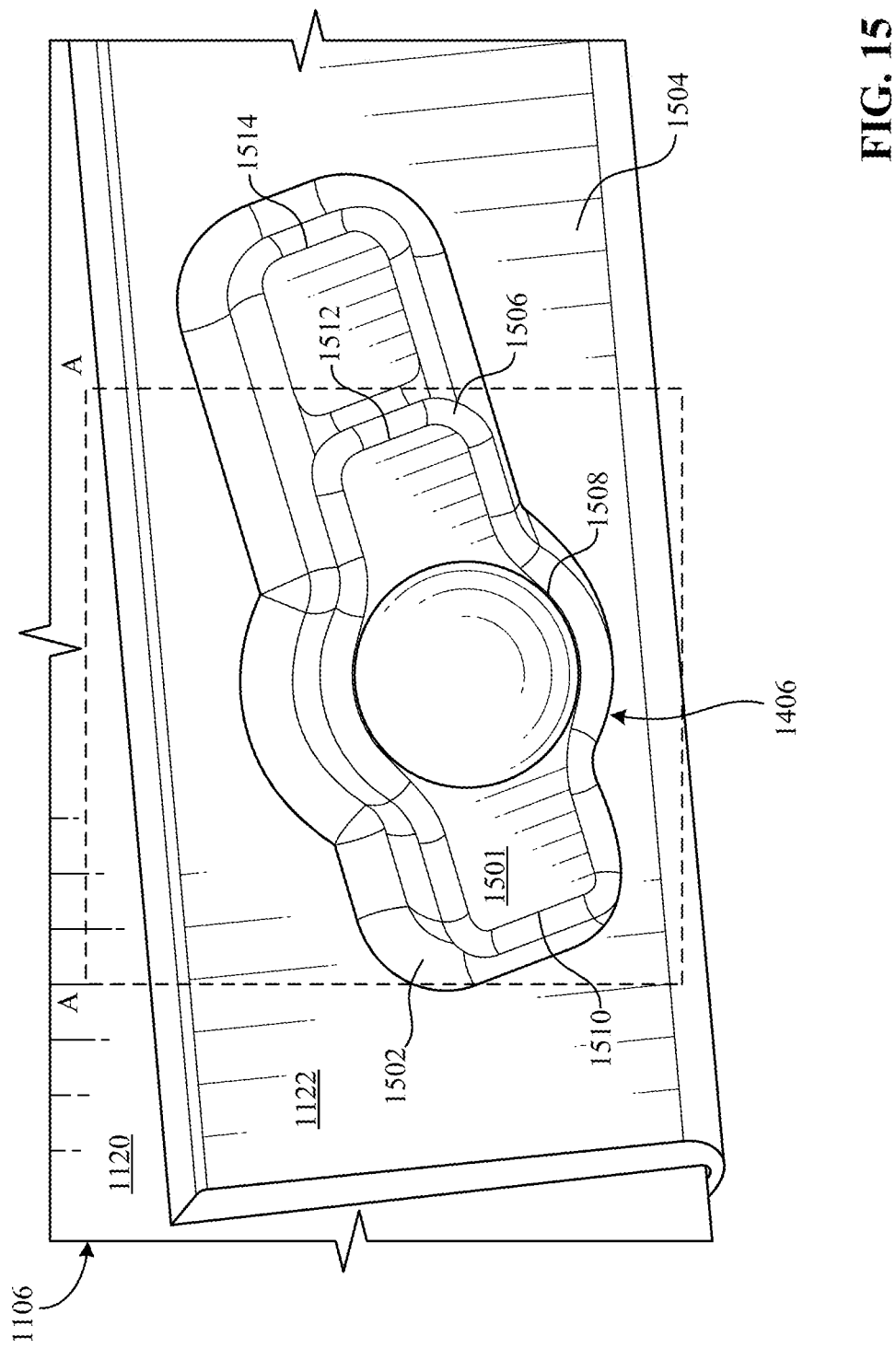
FIG. 15 is an enlarged portion-view of an example drive link and shows an example guide protrusion in accordance with the teachings of this disclosure.

FIG. 15 is an enlarged portion-view of the drive link 1106 of FIGS. 11-14 and shows the first guide protrusion 1406. In particular, the first protrusion 1406 of FIG. 15 is oblong and/or otherwise has a shape that is substantially oblong (e.g., a bowtie shape), which improves performance of the drive link 1106 without increasing packaging size associated therewith. In some examples, the first protrusion 1406 is formed and/or defined by the first drive link portion 1120, the second portion 1122, and/or a combination thereof. Thus, in some examples, the first protrusion 1406 is a single-piece or integral component or is composed of multiples components. Additionally, in some examples, to improve stability and/or durability of the drive link 1106, a shape of the second drive link portion 1120 conforms to a shape of the first drive link portion 1122, as discussed further below.

The first protrusion 1406 of FIG. 15 has an example surface (e.g., an outer surface) 1501, at least a portion of which is configured to slide against the first surface 1422 of the drive shoe 1105. Additionally, in some examples, the surface 1501 of the first protrusion 1406 forms and/or defines one or more example transitional surfaces positioned thereon such as, for example, one or more curved surfaces and/or one or more sloped surfaces. For example, the first protrusion 1406 of FIG. 15 includes a first example transition surface (e.g., a fillet and/or a chamfer) 1502 that is interposed between the first protrusion 1406 and a wall 1504 of the second drive link portion 1122. Further, as shown in FIG. 15, the first protrusion 1406 includes a second example transition surface (e.g., a fillet and/or a chamfer) 1506 that extends at least partially around a perimeter associated with the first protrusion 1406. As a result, such transitional surfaces 1502, 1506 facilitate engagement and/or sliding between the first protrusion 1406 and the first channel 1402 through which the first protrusion 1406 is to travel.

As previously mentioned, the first protrusion 1406 of FIG. 15 is oblong to support or withstand relative large force(s) or load(s) (e.g., generated during a vehicle rollover event). According to the illustrated example of FIG. 15, the first protrusion 1406 includes a curved portion (e.g., a cylindrically shaped portion) 1508 centrally positioned thereon and configured to slidably engage the first surface 1422 of the drive shoe 1105. Further, the first protrusion 1406 of FIG. 15 includes a first protruding portion (e.g., square and/or a rectangular shaped portion) 1510 and a second protruding portion (e.g., square and/or a rectangular shaped portion) 1512 that extend away and/or project from the curved portion 1508. That is, the curved portion 1508 of FIG. 15 is interposed and/or positioned between the first and second protruding portions 1510, 1512. In some examples, the first and second protruding portions 1510, 1512 extend away from the curved portion 1508 in opposite directions relative to each other, which improves strength and/or rigidity of the guide pin 200 without interfering with operation of the drive link 100. Similar to the curved portion 1508, the first and second protruding portions 1510, 1512 are configured to slidably engage the first surface 1422 of the drive shoe 1105. As a result of such an oblong shape, the first protrusion 1406 is enabled to withstand relatively large force(s) or load(s), for example, experienced by the drive link 1106 during a vehicle rollover event, which improves safety of the sunroof 200. In other words, the disclosed oblong protrusion(s) 1406, 1408 improve a loading capacity associated with the drive link 1106. Additionally, in some examples, at least a part 1514 of the second protruding portion 1512 extends further away from the curved portion 1508 relative to the first protruding portion 1510, which further increases the strength and/or rigidity of the first protrusion 1406.

Figure 16:
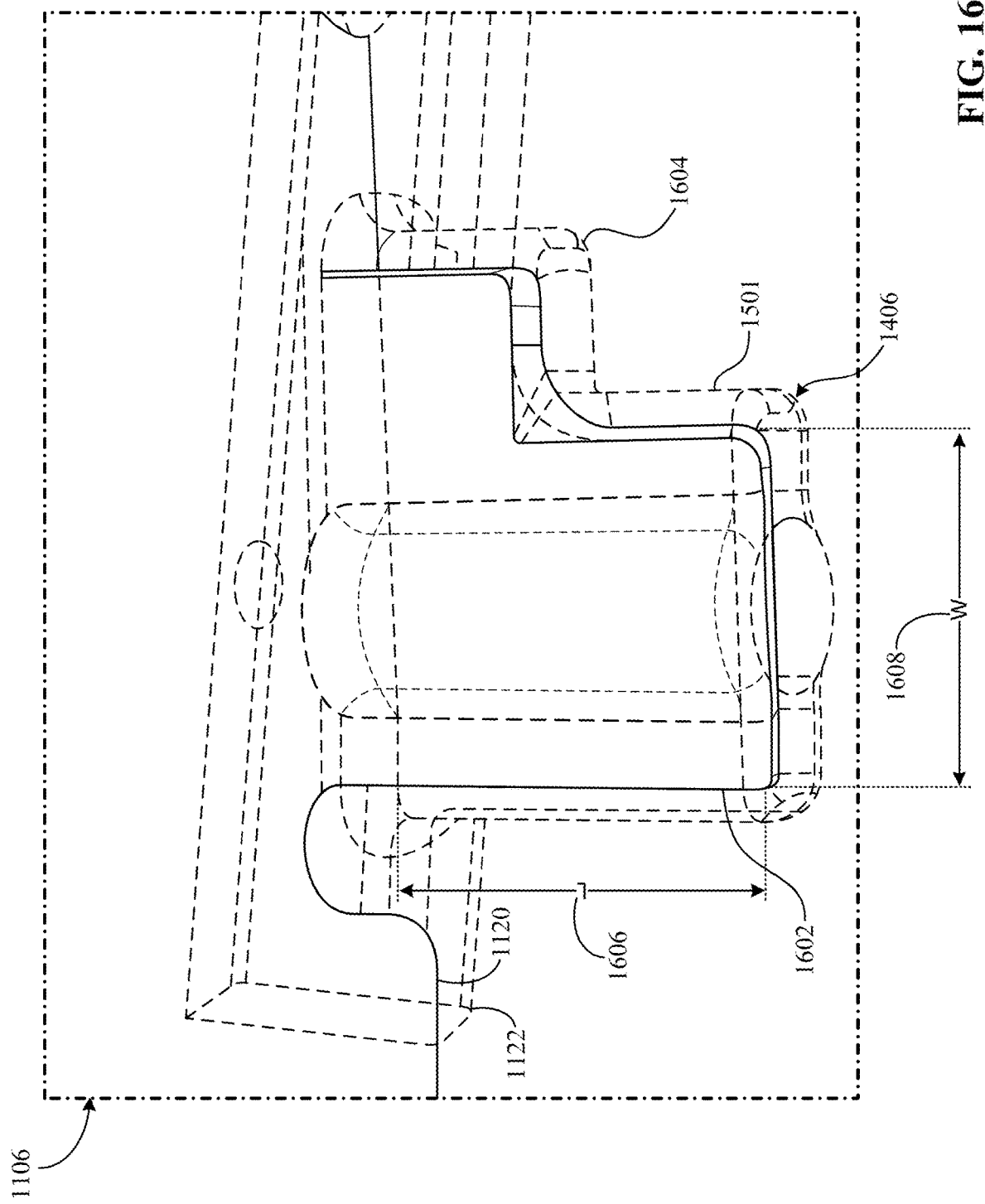
FIG. 16 is another enlarged portion-view of the example drive link of FIG. 15.

FIG. 16 is another enlarged portion-view of the drive link 1106. According to the illustrated example of FIG. 16, the first protrusion 1406 is formed and/or defined by the first portion 1120 of the drive link 1106 and the second portion 1122 of the drive link 1106. In such examples, the first drive link portion 1120 of FIG. 16 includes an example tab 1602 positioned thereon and/or coupled thereto. The tab 1602 and the first drive link portion 1120 of FIG. 16 are formed as a single-piece or integral component, for example, via one or more example metal forming methods or techniques. However, in some examples, the tab 1602 and the first drive link portion 1120 are produced separately and then coupled together, for example, via one or more example fasteners and/or fastening methods. In particular, the tab 1602 of FIG. 16 extends at least partially into the second drive link portion 1122, which increases strength and/or rigidity of the first protrusion 1406 due to advantageous mechanical properties associated with the first material of the first drive link portion 1120 and/or the tab 1602. As such, a part 1604 of the second drive link portion 1122 corresponding to the first protrusion 1406 covers at least a portion of the tab 1602 or the entire tab 1602. In such examples, the part 1604 forms and/or defines the surface 1501 of the first protrusion 1406 for engaging the drive shoe 1105.

Additionally, in some examples, the part 1604 of the second drive link portion 1122 forms and/or defines an example cavity in which the tab 1602 is positioned. That is, in such examples, the cavity of the part 1604 is sized, shaped, structured, and/or otherwise configured to receive the tab 1602 and/or retain the tab 1602 in the cavity. In such examples, the tab 1602 and the part 1604 of the second drive link portion 1122 form and/or define the first protrusion 1406 when the tab 1602 is positioned in the cavity.

In some examples, the first protrusion 1406 and/or at least a portion thereof is L-shaped, which further improves the loading capacity associated with the drive link 1106 and/or increases a moment of inertia associated with the first protrusion 1406. As shown in FIG. 16, the tab 1602 is L-shaped. That is, in such examples, a perimeter associated with the tab 1602 may substantially form an "L." Additionally or alternatively, the part 1604 of the second drive link portion 1122 corresponding to the first protrusion 1406 is L-shaped. In such examples, a perimeter associated with the part 1604 may substantially form an "L." As a result, in such examples, each of the tab 1602, the part 1604, and/or, more generally, first protrusion 1406 has a first dimension (e.g., a length) 1606 and a second dimension (e.g., a width) 1608 that varies across at least a portion of the first dimension 1606.

Figure 17A:
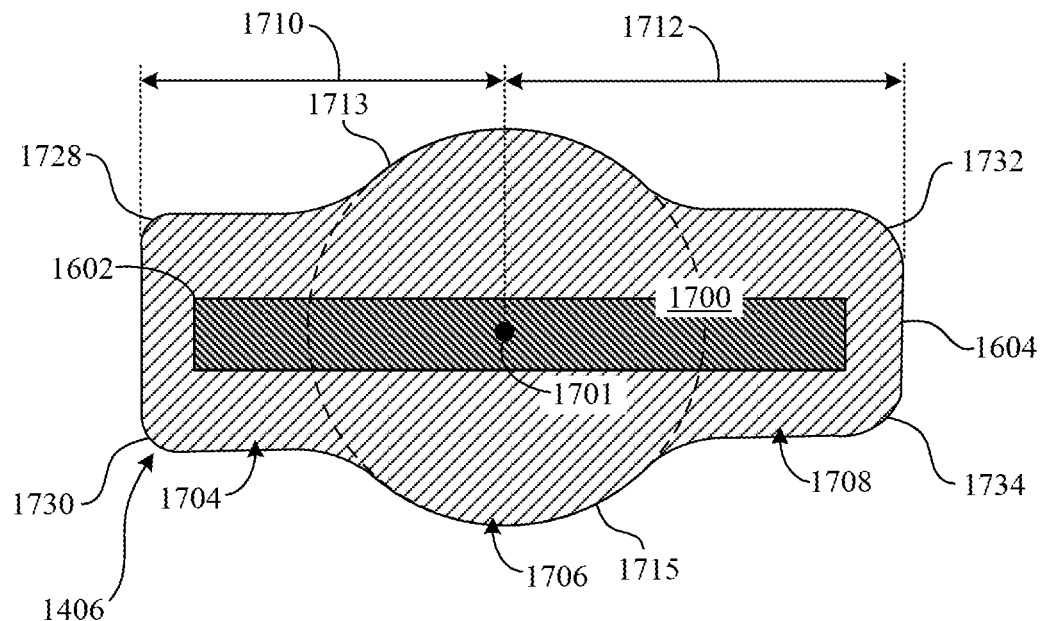
FIGS. 17A and 17B are cross-sectional views of the example guide protrusion of FIG. 15 along line A-A.
Figure 17B:
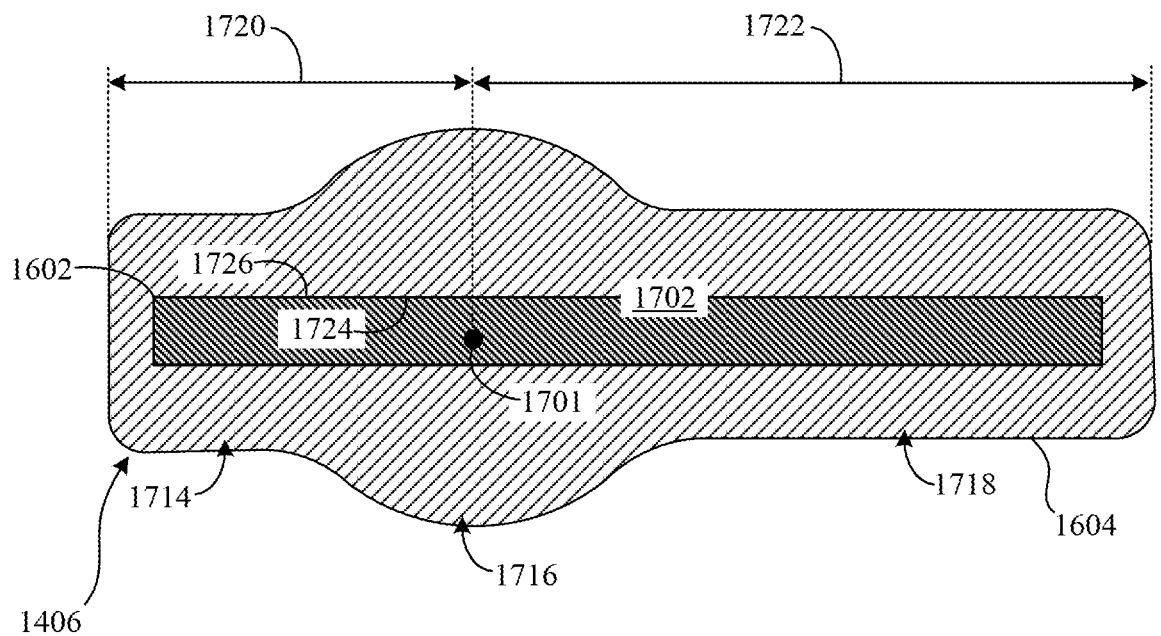

FIGS. 17A and 17B are cross-sectional views of the first protrusion 1406 of FIG. 15 along line A-A. That is, FIG. 17A shows a first example cross-sectional area 1700 of the first protrusion 1406, for example, when the first protrusion 1406 is viewed along an example axis 1701 associated therewith. Further, FIG. 17B shows a second example cross-sectional area 1702 of the first protrusion 1406, for example, when the first protrusion 1406 is viewed along the axis 1701. In particular, each of the first and second cross-sectional areas 1700, 1702 is oblong and/or otherwise has a shape that is substantially oblong.

According to the illustrated example of FIG. 17A, the first cross-sectional area 1700 of the first protrusion 1406 includes a first example area (e.g., a first rectangular area) 1704, a second example area (e.g., a curved area and/or a circular area) 1706, and a third example area (e.g., a second rectangular area) 1708. The second area 1706 of FIG. 17A is interposed between the first and third areas 1704, 1708. In such examples, the first and third areas 1704, 1708 extend away from the second area 1706 in opposite directions. For example, as shown in FIG. 17A, the first area 1704 extends away from the second area 1706 radially outward relative to the axis 1701. That is, in such examples, the axis 1701 extends through a center or central portion of the second area 1706, as shown in FIG. 17A. Similarly, the third area 1708 of FIG. 17A extends away from the second area 1706 radially outward relative to the axis 1701. In some examples, the first area 1704 extends away from the second area 1706 and/or the axis 1701 in a first direction by a first distance 1710, and the third area 1708 extends away from the second area 1706 and/or the axis 1701 in a second direction, opposite the first direction, by a second distance 1712. In such examples, the first and second distances 1710, 1712 are substantially equal or the same.

In some examples, the second area 1706 is substantially curved and/or circular, as shown in FIG. 17A. As such, the second area 1706 of FIG. 17A corresponds to and/or at least partially defines the curved portion 1508 of the first protrusion 1406. In such examples, the second area 1706 forms and/or defines one or more curved surfaces 1713, 1715 of the first protrusion 1406, two of which are shown in this example (i.e., a first curved surface 1713 and a second curved surface 1715). As shown in FIG. 17A, the first curved surface 1713 corresponds to a topmost (in the orientation of FIG. 17A) portion of the first protrusion 1406. Further, the second curved surface 1715 of FIG. 17A corresponds to a bottommost (in the orientation of FIG. 17A) portion of the first protrusion 1406. Additionally, in some examples, each of the first area 1704 and the third area 1708 is rectangular and/or otherwise has a shape that is substantially rectangular (e.g., a rounded rectangle shape), as shown in FIG. 17A. As such, the first area 1704 of FIG. 17A corresponds to and/or at least partially defines the first protruding portion 1510 of the first protrusion 1406, and the third area 1708 of FIG. 17A corresponds to and/or at least partially defines the second protruding portion 1512 of the first protrusion 1406.

As shown in FIG. 17A, the tab 1602 is centrally disposed within the part 1604 of the second drive link portion 1122 corresponding to the first protrusion 1406. As such, in some examples, the first cross-sectional area 1700 of the first protrusion 1406 is formed and/or defined by the tab 1602 and the part 1604.

In some examples, the first area 1704 forms and/or defines one or more transitional surfaces (e.g., the transitional surface(s) 1502, 1506 of FIG. 15) 1728, 1730 of the first protrusion 1406, two of which are shown in this example (i.e., a third transitional surface 1728 and a fourth transitional surface 1730). In some examples, the third transitional surface 1728 includes a first fillet and/or a first chamfer, and the fourth transitional surface 1730 includes a second fillet and/or a second chamfer. In particular, in such examples, the third transitional surface 1728 and/or the fourth transitional surface 1730 are configured to slidably engage and/or otherwise contact the first surface 1422 of the drive shoe 1105.

Additionally or alternatively, in some examples, the third area 1708 forms and/or defines one or more transitional surfaces (e.g., the transitional surface(s) 1502, 1506 of FIG. 15) 1732, 1734 of the first protrusion 1406, two of which are shown in this example (i.e., a fifth transitional surface 1732 and a sixth transitional surface 1734). In some examples, the fifth transitional surface 1732 includes a third fillet and/or a third chamfer, and the sixth transitional surface 1734 includes a fourth fillet and/or a fourth chamfer. In particular, in such examples, the fifth transitional surface 1732 and/or the sixth transitional surface 1734 are configured to slidably engage and/or otherwise contact the first surface 1422 of the drive shoe 1105.

In examples where the first protrusion 1406 includes such transitional surface(s), the fillet(s) and/or the chamfers of FIG. 17A may be any sufficient size and/or shape. For example, each of the first, second, and/or fourth fillets has a radius of curvature associated therewith such as, for example, 0.1 millimeter (mm), 1 mm, 5 mm, 10 mm, 25 mm, etc.

According to the illustrated example of FIG. 17B, the second cross-sectional area 1702 of the first protrusion 1406 includes a first example area (e.g., a rectangular area) 1714, a second example area (e.g., a curved area and/or a circular area) 1716, and a third example area (e.g., a rectangular area) 1718, similar to the first cross-sectional area 1700. The second area 1716 of FIG. 17B is interposed between the first and third areas 1714, 1718. In such examples, the first and third areas 1714, 1718 extend away from the second area 1716 in opposite directions. For example, as shown in FIG. 17B, the first area 1714 extends away from the second portion 1706 radially outward relative to the axis 1701. That is, in such examples, the axis 1701 extends through a center or central portion of the second area 1716, as shown in FIG. 17B. Similarly, the third area 1718 of FIG. 17B extends away from the second portion 1716 radially outward relative to the axis 1701. In some examples, the first area 1714 extends away from the second area 1716 and/or the axis 1701 in the first direction by a third example distance (e.g., substantially equal or the same relative to the first distance 1710) 1720, and the third area 1718 extends away from the second area 1716 and/or the axis 1701 in the second direction by a fourth example distance 1722. In such examples, the fourth distance 1722 is greater than the third distance 1720. As such, the third area 1718 of FIG. 17B extends further away from the axis 1701 and/or the second area 1716 compared to the first area 1714, which further increases strength and/or rigidity of the first guide protrusion 1406.

In some examples, the part 1604 of the second drive link portion 1122 includes an example surface (e.g., an inner surface) 1724 that is shaped similarly to an example surface (e.g., an outer surface) 1726 of the tab 1602. That is, in such examples, the part 1604 is sized and/or shaped such that the surface 1724 conforms to the surface 1726 of the tab 1602. Thus, in examples where the tab 1602 is formed by the first portion 1120 of the drive link 1106 and the part 1602 is formed by the second portion 1122 of the drive link 1106, the second portion 1122 of the drive link 1106 is shaped such that the surface 1724 thereof conforms to the surface 1726 of the first portion 1120 of the drive link 1106. In this manner, the surfaces 1724, 1726 substantially engage each other and/or maintain such engagement during operation of the vehicle sunroof 200.

Although FIGS. 15, 16, 17A and 17B depict aspects in connection with the first protrusion 1406, in some examples, such aspects likewise apply to one or more other guide protrusions associated with the drive link 1106 such as, for example, the second protrusion 1408. For example, the second protrusion 1408 includes one or more cross-sectional areas that are oblong and/or otherwise have shapes that are substantially oblong, similar to the first protrusion 1406.

It will be appreciated that the apparatus, systems, and methods disclosed in the foregoing description provide numerous advantages. Some disclosed examples prevent twisting of a sunroof drive link during operation of a vehicle sunroof. Some disclosed examples prevent failure associated with the sunroof drive link during certain driving conditions and/or driving events. As a result, disclosed examples improve sunroof performance and/or vehicle safety.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An assembly for a vehicle sunroof, comprising:
a drive shoe including a ramp portion positioned thereon; and
a drive link rotatably coupled to the drive shoe and supporting a panel, the drive link including a guide portion positioned thereon and configured to slidably engage the ramp portion to prevent the drive link from rotating during a sunroof operation,
the guide portion including an extension that is positioned thereon and interposed between the drive shoe and a guide block, the extension configured to slidably engage the ramp portion or the guide block to prevent the drive link from twisting during the sunroof operation.

2. The assembly of claim 1, wherein the extension has a shape that is oblong.

3. The assembly of claim 2, wherein the oblong extension extends along a curved surface of the guide portion.

4. The assembly of claim 2, wherein the oblong extension includes a first portion that extends along a curved path and a second portion that extends along a linear path.

5. The assembly of claim 1, wherein the guide portion extends into a channel of the guide block and is configured to slidably engage a surface of the guide block formed by the channel.

6. The assembly of claim 1, wherein the drive link includes a first portion and a second portion coupled to the first portion, the first portion configured to receive a panel bracket at or near an end of the first portion, the second portion defining the guide portion.

7. The assembly of claim 6, wherein the first portion includes a first material and the second portion includes a second material different from the first material.

8. The assembly of claim 1, wherein the drive shoe includes first and second channels positioned thereon, and wherein the drive link includes first and second protrusions positioned thereon and that are configured to slide through the respective first and second channels, movement of the drive shoe relative to the drive link to cause the drive link to rotate relative to the first protrusion or the second protrusion.

9. An assembly for a vehicle sunroof, comprising:
a drive shoe including a first channel positioned thereon; and
a drive link rotatably coupled to the drive shoe and supporting a panel, the drive link including a first protrusion positioned thereon and extending at least partially into the first channel, the first protrusion configured to slidably engage a first surface of the drive shoe forming the first channel to cause the drive link to translate during a sunroof operation,
wherein the first protrusion includes a cross-sectional area that is oblong.

10. The assembly of claim 9, wherein the drive link includes a second protrusion positioned thereon and extending at least partially into a second channel of the drive shoe, the second protrusion configured to slidably engage a second surface of the drive shoe forming the second channel to cause the drive link to translate, wherein the second protrusion includes a cross-sectional area that is oblong.

11. The assembly of claim 9, wherein the drive link includes a tab.

12. The assembly of claim 11, wherein the tab is L-shaped.

13. The assembly of claim 9, wherein the first protrusion has a length and a width that varies across at least a portion of the length.

14. The assembly of claim 9, wherein the cross-sectional area of the first protrusion includes a circular area, a first rectangular area, and a second rectangular area.

15. The assembly of claim 14, wherein the circular area is interposed between the first and second rectangular areas.

16. The assembly of claim 14, wherein the first rectangular area defines a first fillet or chamfer of the first protrusion that is configured to contact the first surface of the drive shoe, and wherein the second rectangular area defines a second fillet or chamfer of the first protrusion that is configured to contact the first surface of the drive shoe.

* * * * *